United States Patent [19]
Weber et al.

[11] Patent Number: 6,028,655
[45] Date of Patent: *Feb. 22, 2000

[54] TN AND STN LIQUID-CRYSTAL DISPLAY

[75] Inventors: Georg Weber, Erzhausen; Harald Hirschmann, Darmstadt; Volker Reiffenrath; Ursula Patwal, both of Rossdorf; Dagmar Zimmermann, Gross-Gerau, all of Germany

[73] Assignee: Merck Patent Gesellschaft Mit Beschrankter Haftung, Germany

[ * ] Notice: This patent is subject to a terminal disclaimer.

[21] Appl. No.: 08/961,920

[22] Filed: Oct. 31, 1997

[30] Foreign Application Priority Data

Oct. 31, 1996 [DE] Germany ............. 196 44 042

[51] Int. Cl.$^7$ .......................... G02F 1/133; C09K 19/42; C09K 19/46
[52] U.S. Cl. ............... 349/182; 252/299.61; 252/299.63; 252/299.66; 252/299.67
[58] Field of Search ............... 252/299.01, 299.64, 252/299.65, 299.61, 299.66, 299.67, 299.63; 349/182, 186

[56] References Cited

U.S. PATENT DOCUMENTS

| | | | |
|---|---|---|---|
| 5,308,538 | 5/1994 | Weber et al. | 252/299.61 |
| 5,374,374 | 12/1994 | Weber et al. | 252/299.63 |
| 5,387,369 | 2/1995 | Weber et al. | 252/299.01 |
| 5,516,454 | 5/1996 | Scheuble et al. | 252/299.01 |
| 5,702,640 | 12/1997 | Junge et al. | 252/299.01 |
| 5,714,087 | 2/1998 | Pausch et al. | 252/299.01 |

*Primary Examiner*—Shean C. Wu
*Attorney, Agent, or Firm*—Millen, White, Zelano & Branigan, P.C.

[57] ABSTRACT

The invention relates to TN liquid-crystal displays and supertwist liquid-crystal displays (SLCDs) having very short response times and good steepnesses and angle dependences, and to the novel nematic liquid-crystal mixtures used therein, which are distinguished by the fact that they comprise at least one compound o the formula IA

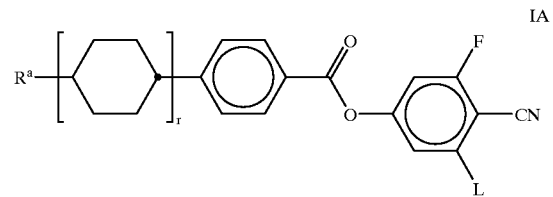

and at least one compound of the formula IB

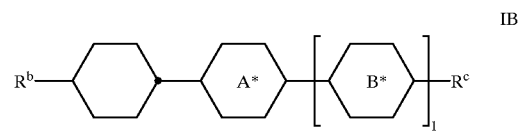

in which
$R^a$, $R^b$, $R^c$, Ring A*, L, l and r are as defined in claim 1.

16 Claims, No Drawings

TN AND STN LIQUID-CRYSTAL DISPLAY

The invention relates to TN liquid-crystal displays and supertwist liquid-crystal displays (SLCDs) having very short response times and good steepnesses and angle dependencies, and to the novel nematic liquid-crystal mixtures used therein.

SLCDs as define din the preamble are known, for example from EP 0 131 216 B1; De 34 23 993 A1; EP 0 098 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katch et al., Japanese journal of Applied Physics, Vol. 26, No. 11, L 1782-L 1786 (1987); F. Leenhouts et al., Appl. Phys. Lett. 50 (21), 1468 (1987); H. A. van sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A-35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the viscosities, in particular, of the liquid-crystal mixtures were hitherto optimized using usually monotropic additives having relatively high vapour pressure. However, the response times achieved were not adequate for all applications.

In order to achieve a steep electrooptical characteristic line, the liquid-crystal mixtures should have relatively large values for $K_3/K_1$ and relatively small values for $\Delta\epsilon/\epsilon_1$.

In addition to optimization of the contrast and the response times, further important requirements are made of mixtures of this type:
1. A broad d/p window
2. High long-term chemical stability
3. High electrical resistance
4. Low frequency dependence of the threshold voltage.

The parameter combinations achieved are still far from adequate, in particular for high-multiplex STNs (1/400). This is in some cases attributable to the fact that the various requirements are affected in opposite manners by material parameters.

There thus continues to be a great demand for TN and STN displays having very short response times and at the same time a large operating temperature range, high characteristic line steepness, good angle dependence of the contrast and low threshold voltage which meet the above-mentioned requirements.

The invention has the object of providing liquid-crystal displays which do not have the abovementioned disadvantages, or only do so to a lesser extent, and at the same time have very good response times and very good steepnesses.

It has now been found that this object can be achieved if nematic liquid-crystal mixtures are used which comprise esters of the formula IA

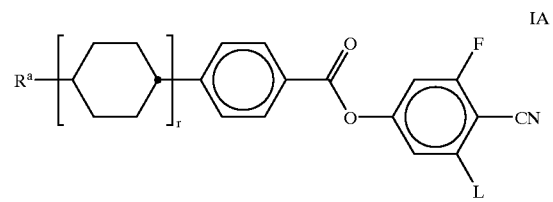

in which
$R^a$ is an alkyl group having 1 to 12 carbon atoms, in which, in addition, one or two non-adjacent $CH_2$ groups may be replaced by —O—, —CH=CH—, —CO—, —OCO— or —COO—,
L is H or F, and
r is 0 or 1,
in combination with alkenyl compounds of the formula IB

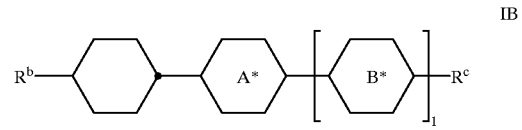

in which
$R^b$ is alkenyl having 2 to 12 carbons atoms,
$R^c$ is F, an unsubstituted or at least monofluoro-substituted alkyl or alkoxy radical having 1–6 carbon atoms,

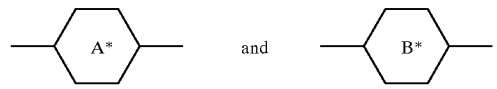

are each, independently of one another,

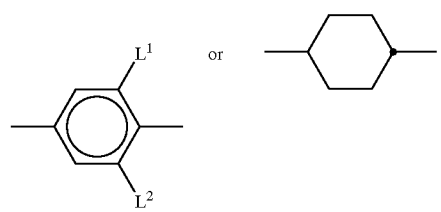

l is 0 or 1, and
$L^1$ and $L^2$ are each, independently of one another, H or F.
The use of compounds of the formulae IA and IB in TN and STN mixtures produces
  low viscosity and low temperature dependence of the viscosity at moderate $\mu n$,
  long shelf lives in the display at low temperatures,
  very fast S→N transitions,
  low threshold voltages, and
  very fast response times, in particular at low temperatures.
The compounds of the formulae IA and IB significantly shorten the response times of TN and STN mixtures without impairing the steepnesses.

The invention thus relates to a liquid-crystal display containing
  two outer plates which, together with a frame, form a cell, a nematic liquid-crystal mixture of positive dielectric anisotropy which is present in the cell, electrode layers with alignment layers on the insides of the outer plates, a pretilt angle between the longitudinal axis of the molecules at the surface of the outer plates and the outer plates of from about 0 degree to 30 degrees, and a twist angle of the liquid-crystal mixture in the cell from alignment layer to alignment layer with a value of between 22.5° and 600°, a nematic liquid-crystal mixture comprising a) 20–90% by weight of a liquid-crystalline component A consisting of one or more compounds having a dielectric anisotropy of greater than +1.5;

b) 10–65% by weight of a liquid-crystalline component B consisting of one or more compounds having a dielectric anisotropy of between −1.5 and +1.5;

c) 0–20% by weight of a liquid-crystalline component D consisting of one or more compounds having a dielectric anisotropy of below −1.5, and d) if desired, an optically active component C in such an amount that the ratio between the layer thickness (separation of the outer plates) and the natural pitch of the chiral nematic liquid-crystal mixture is from about 0.2 to 1.3, characterized in that component A comprises at least one compound of the formula IA

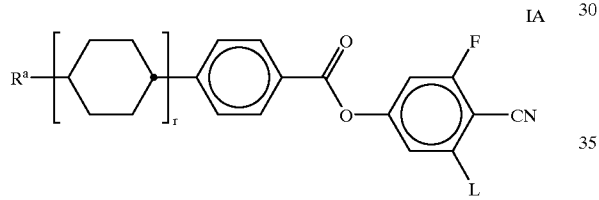

in which $R^a$ is an alkyl group having 1 to 12 carbon atoms, in which, in addition, one or two non-adjacent $CH_2$ groups may be replaced by —O—, —CH=CH—, —CO—, —OCO— or —COO—, L is H or F, and r is 0 or 1, and component B comprises at least one compound of the formula IB

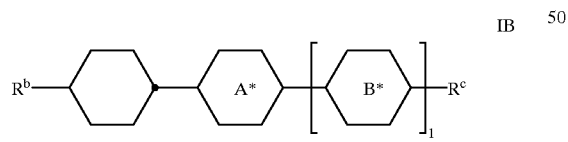

in which $R^b$ is an alkenyl radical having 2 to 12 carbon atoms, $R^c$ is F, or an unsubstituted or at least monofluoro-substituted alkyl or alkoxy radical having 1–6 carbon atoms,

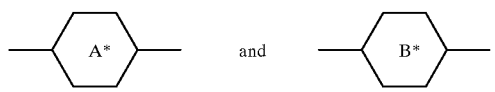

are each, independently of one another,

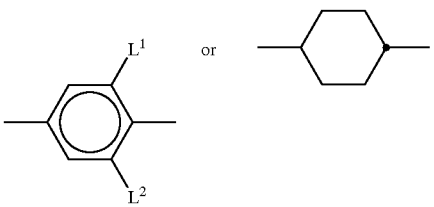

l is 0 or 1, and $L_1$ and $L_2$ are each, independently of one another, H or F.

The invention also relates to corresponding liquid-crystal mixtures for use in STN and TN displays.

Preferred compounds of the formula IA are, in particular, compounds of the subformulae IA1 and IA2 (L=H or F):

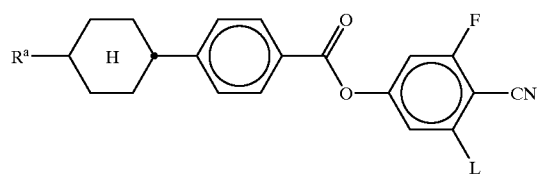

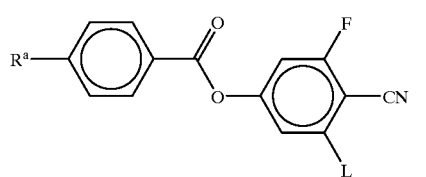

Preferred compounds of the formula IB are, in particular, compounds of the subformulae IB1 to IB6:

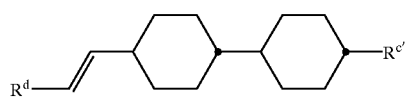

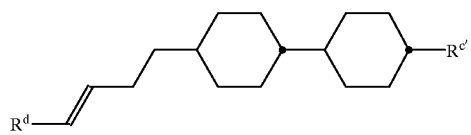

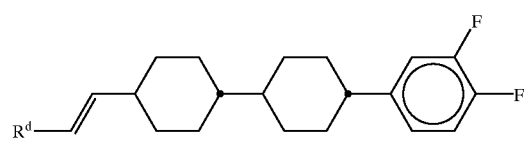

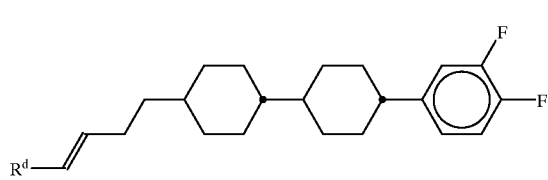

-continued

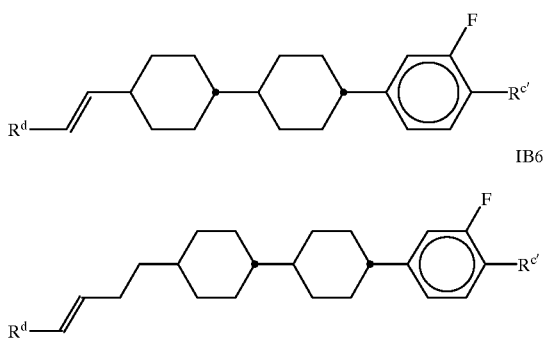

where

R$^{c'}$ is a straight-chain alkyl or alkoxy radical having 1–6 carbon atoms, and R$^d$ is H, CH$_3$, C$_2$H$_5$ or n—C$_3$H$_7$.

Component A preferably comprises, in addition to the compounds of the formula IA, compounds of the formulae II and/or III

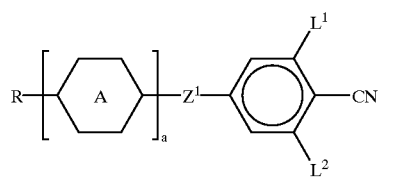

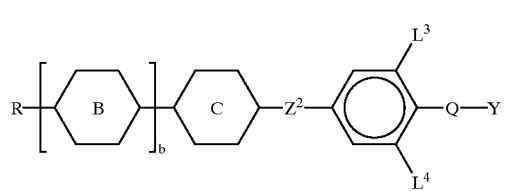

in which

R is an alkyl group having 1 to 12 carbon atoms, in which, in addition, one or two non-adjacent CH$_2$ groups may be replaced by —O—, —CH=CH—, —CO—, —OCO— or —COO—, in particular a transalkenyl group having 2 to 7 carbon atoms,

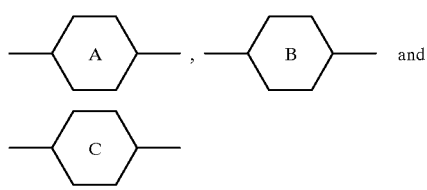

are each, independently of one another,

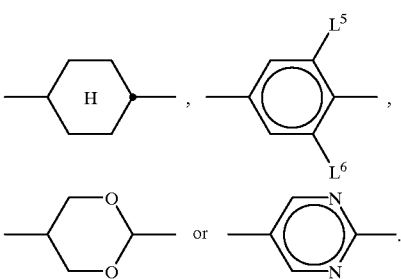

L$^{1-6}$ are each, independently of one another, H or F,

Z$^1$ is —COO—, —CH$_2$CH$_2$— or a single bond,

Z$^2$ is —CH$_2$CH$_2$—, —COO—, —C≡C— or a single bond,

Q is —CF$_2$—, —CHF—, —OCF$_2$—, —OCHF— or a single bond,

Y is F or Cl a is 1 or 2, and b is 0 or 1.

Preferred compounds of the formula II conform to the subformulae IIa to IId;

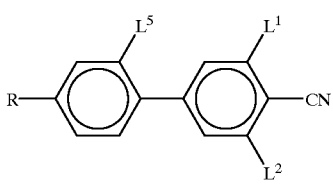

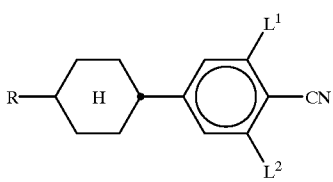

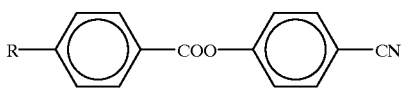

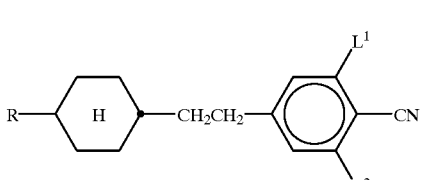

in which R, L$^1$, L$^2$ and L$^5$ are as defined above.

Preferred compounds of the formula III conform to the subformulae IIIa–IIIt (L$^3$ and L$^4$=H or F):

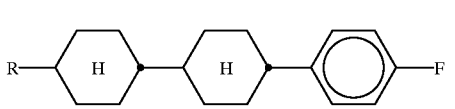

IIIb
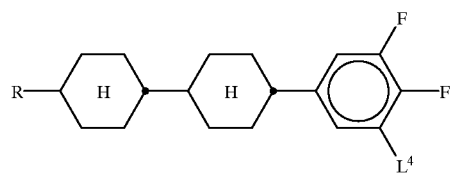
IIIc
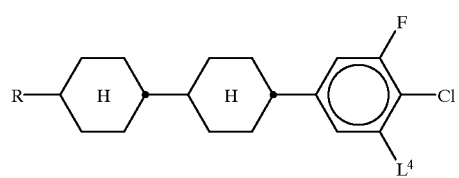
IIId
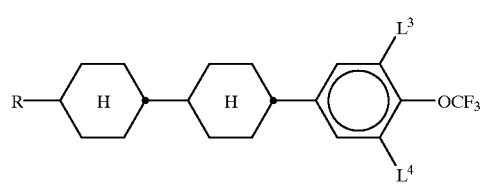
IIIe
IIIf
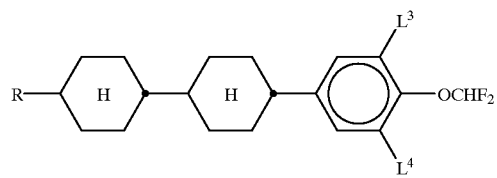
IIIg
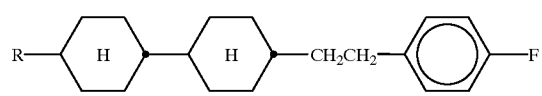
IIIh
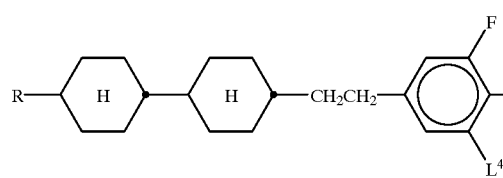
IIIi
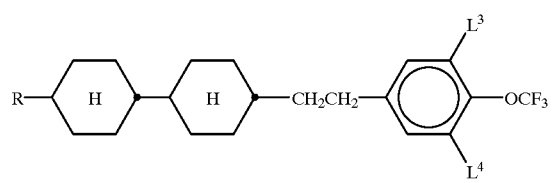
IIIj
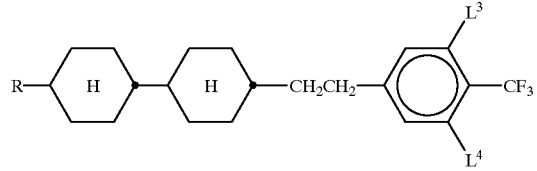
IIIk
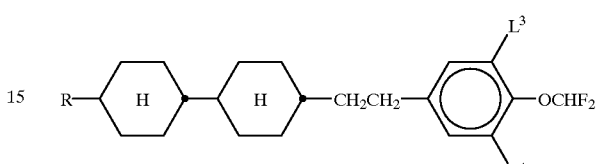
IIIl
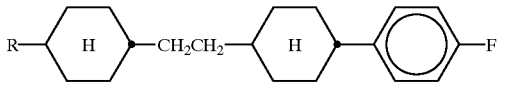
IIIm
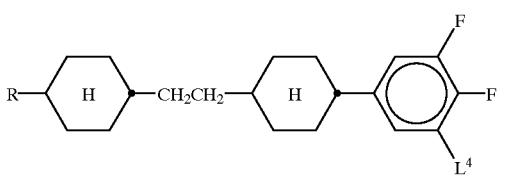
IIIn
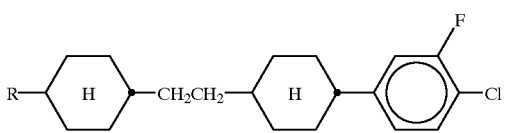
IIIo
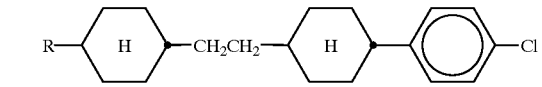
IIIp, IIIq
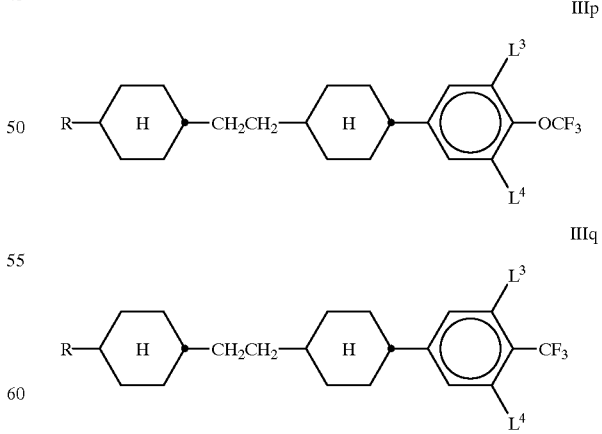

-continued

IIIr
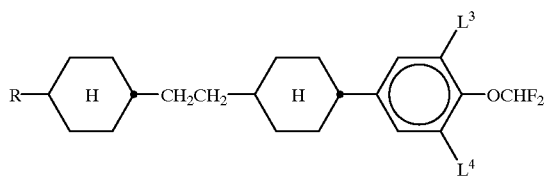

IIIs
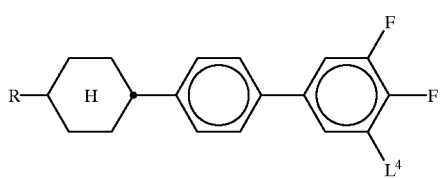

IIIt
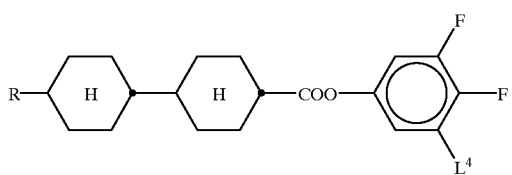

In addition to one or more compounds of the formula IA and IB, preferred mixtures comprise one, two, three, or more compounds of the formulae IIa, IIb, IIc, IId, IIIb, IIId, IIIf, IIIh, IIIi, IIIm or IIIs, preferably one or more compounds of the formula IIIb, IIId or IIIh, and one to four compounds of the formulae IA and IB and one to three compounds of the formulae IIa and/or IIb.

The individual compounds, for example, of the formulae II and III or their subformulae or alternatively other compounds which can be used in the novel TN liquid-crystal displays and SLCDs are either known or can be prepared analogously to the known compounds.

In a particularly preferred embodiment, component A additionally comprises compounds of the formulae AI to AV:

AI
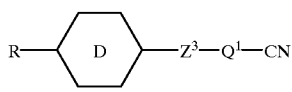

AII
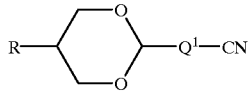

AIII
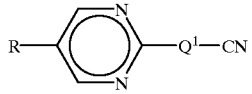

AIV
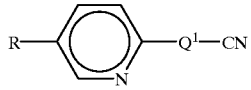

AV

in which

R is an alkyl group having 1 to 12 carbon atoms, in which, in addition, one or two non-adjacent $CH_2$ groups may also be replaced by —O—, —CH=CH—, —CO—, —OCO— or —COO—, in particular a trans-alkenyl group having 2 to 7 carbon atoms, $Q^1$

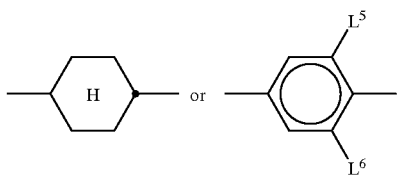

$L^5$ and $L^6$ are each, independently of one another, H or F, $Z^3$ is

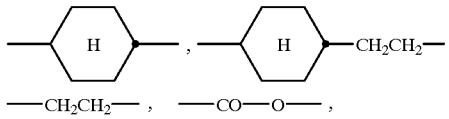

—CO—O—, —O—CO— or a single bond, and

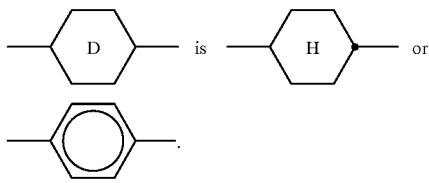

The mixture preferably comprise from 5 to 50% of compounds of the formula IA. Preference is given to compounds of the formula II in which $Z^1$ is —$CH_2CH_2$—, —COO— or a single bond, in particular compounds of the formulae IIa1, IIb1, IId1, IIa2 and IIb2:

IIa1
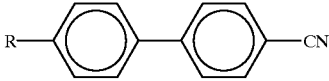

IIb1
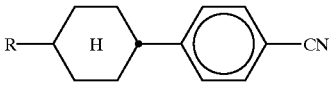

IId1
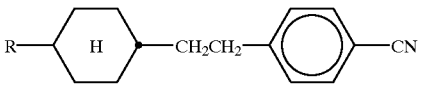

IIa2
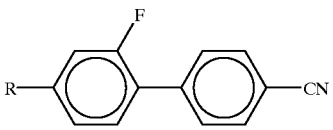

-continued

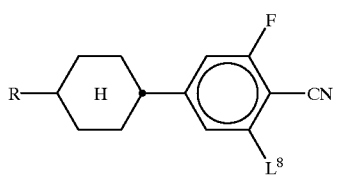
IIb2

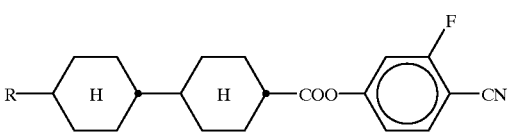
IIi1

Component A preferably comprises one or more compounds of the formulae IIb1.

The novel mixtures preferably comprise one or more polar compounds having a high clearing point selected from the group consisting of the compounds IIe to IIi:

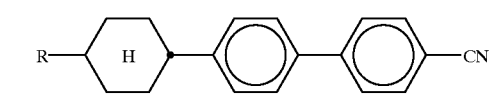
IIe

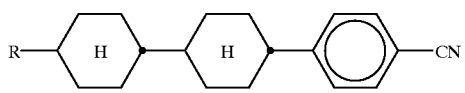
IIf

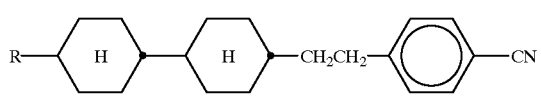
IIg

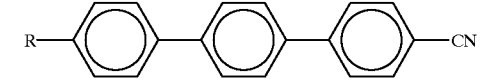
IIh

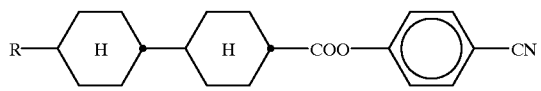
IIi

In the compounds IIe to IIi, the 1,4-phenylene rings can also be laterally substituted by one or two fluorine atoms. Preferred compounds of this type are the compounds of the formulae IIe1, IIe2, IIe3 and IIi1:

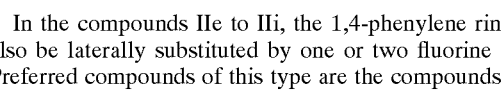
IIe1

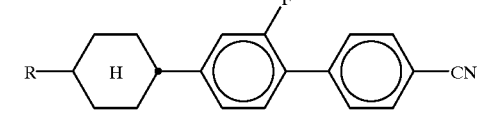
IIe2

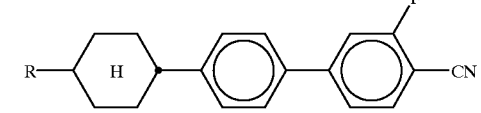
IIe3

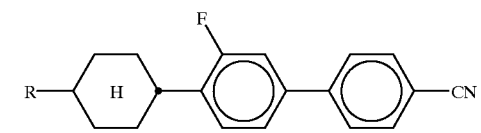

In the novel mixtures, the proportion of compounds IIe to IIi is preferably from about 2 to 25%.

Preferred liquid-crystal mixtures comprise one or more compounds from Group B, preferably 10 to 40%. The compounds from Group B are distinguished both by their low rotational viscosity ($\gamma_1$) values of <150 mPa·s and by their high clearing point (>120° C.).

Component B preferably, in addition to one or more compounds of the formula IB, comprises one or more compounds selected from the group consisting of the compounds of the formulae IV1 to IV9:

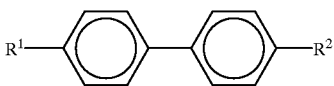
IV1

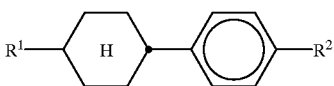
IV2

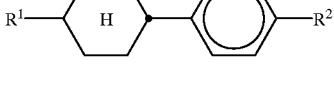
IV3

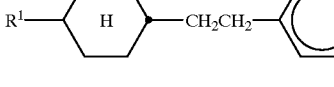
IV4

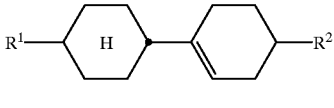
IV5

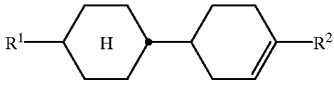
IV6

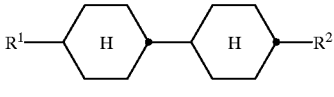
IV7

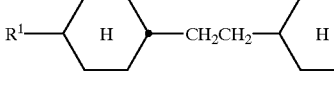
IV8

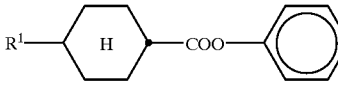
IV9 in which $R^1$ and $R^2$ are as defined for R.

In a particularly preferred embodiment, the novel mixture comprises at least one compound of the formula IV1 and/or IV1.

Component B additionally comprises one or more compounds selected from the group consisting of the compounds of the formulae IV10 to IV14:
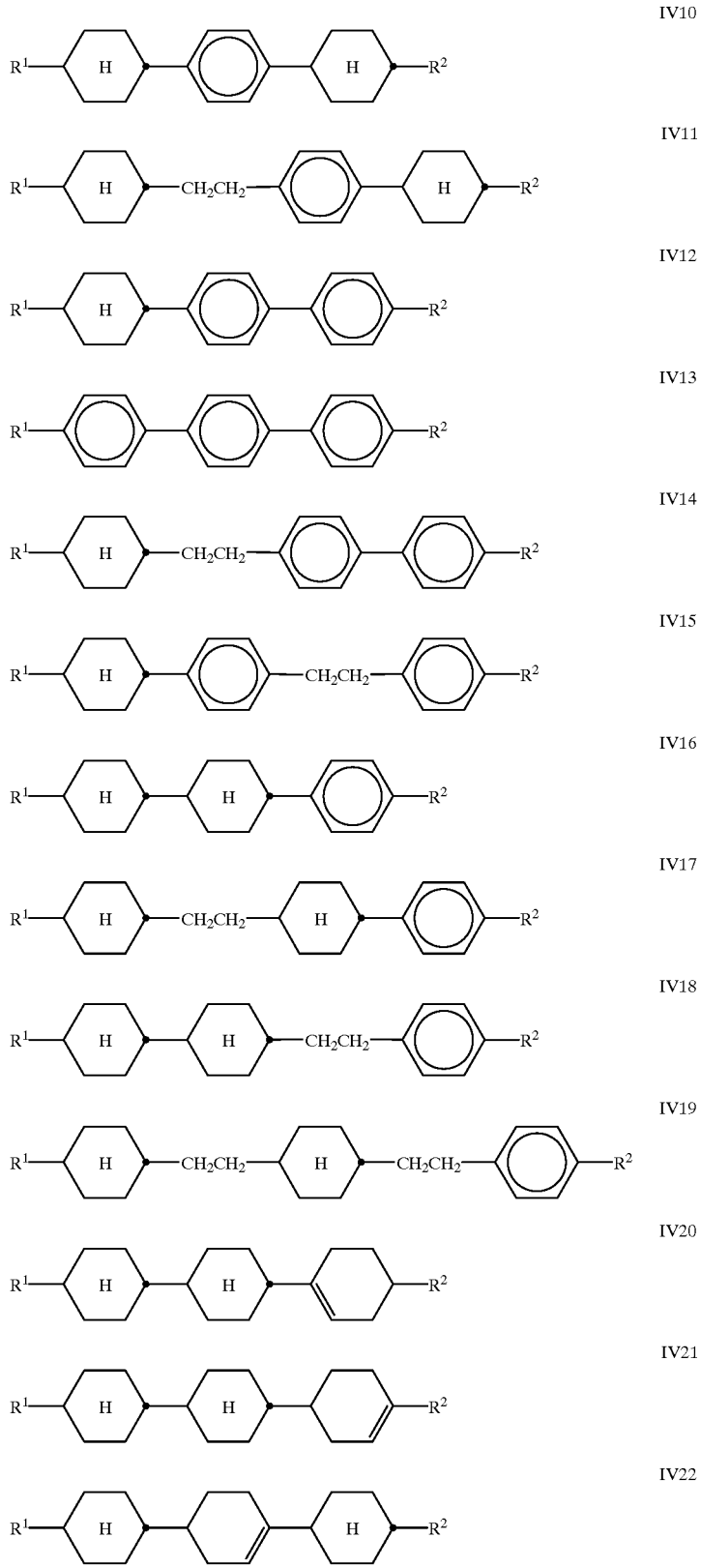

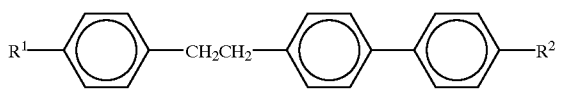

IV23

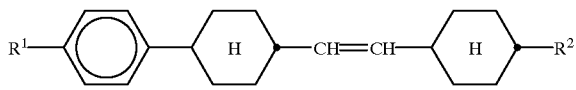

IV24 in which R¹ and R² are as defined for R, and the 1,4-phenylene groups in IV10 to IV19, IV12 and IV23 may each, independently of one another, also be monosubstituted or polysubstituted by fluorine.

In a particularly preferred embodiment, the novel media comprise at least one compound of the formulae IA and IB and at least one compound of the formulae IV12 and/or IV16, in which R¹ is trans-alkenyl having 2 to 10 carbon atoms, in particular 1E-alkenyl or 3E-alkenyl.

Component B additionally, in addition to component IB, comprises one or more compounds selected from the group consisting of the compounds of the formulae IV25 to IV30:

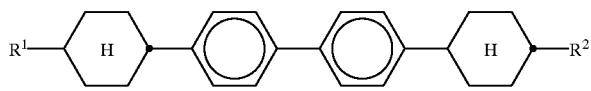

IV25

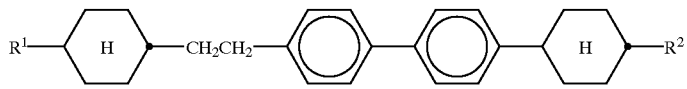

IV26

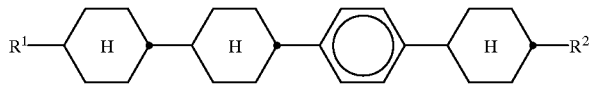

IV27

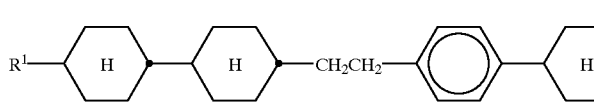

IV28

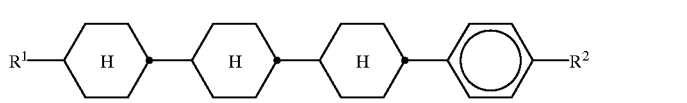

IV29

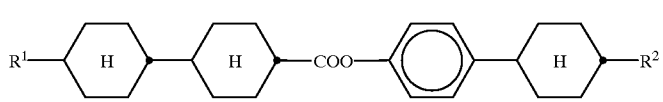

IV30 in which R¹ and R² are as defined for R, and the 1,4-phenylene groups in IV25 to IV30 may also each, independently of one another, be monosubstituted or polysubstituted by fluorine.

Component B optionally comprises one or more compounds selected from the group consisting of the compounds of the formula IV31 and IV32:

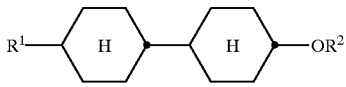

IV31

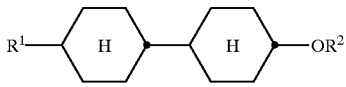

IV32 in which $C_rH_{2r+1}$ is a straight-chain alkyl group having up to 9 carbon atoms.

The novel liquid-crystal mixture may furthermore comprise one or more compounds selected from the group

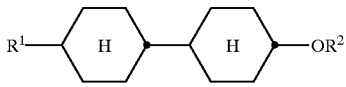

-continued

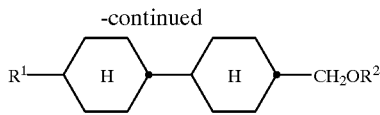

in which $R^1$ and $R^2$ are as defined for R.

Preferred liquid-crystal mixtures comprise at least one component selected from the group consisting of the following compounds:

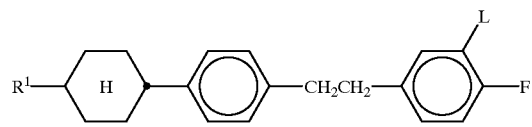

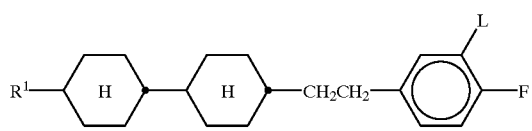

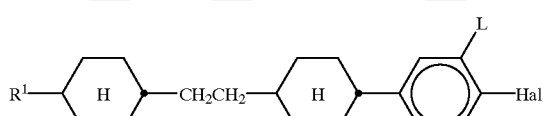

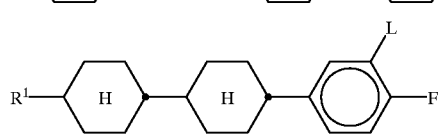

in which Hal is F or Cl, L is H or F, and R and $R^1$ are as defined above.

The liquid-crystal mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopes, some commercially available, is available to the person skilled in the art, for example such as cholesteryl nonanoate, S-811 form Merck KGaA, Darmstadt, FRG, and CB 15 (BDH, Poole, UK), as well as C 15, exemplified in Table B. The choice of dopes is not crucial per se.

Component D comprises compounds with a dielectric anisotropy below −1.5 such as, e.g., those disclosed in WO 89/08633, U.S. Pat. No. 5,204,019 and U.S. Pat. No. 5,248,447.

The novel liquid-crystal mixture preferably comprises one or more compounds selected from Group B1 consisting of compounds of the formulae B1I to B1IV:

B1I

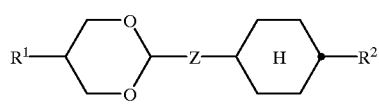

B1II

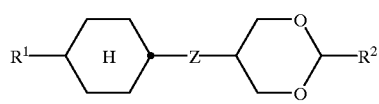

B1III

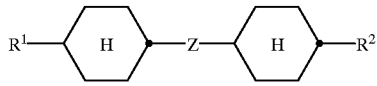

B1IV

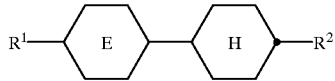

in which
$R^1$ and $R^2$ are each, independently of one another, as defined for R,
Z is —CH$_2$CH$_2$—, —CO—O—, —O—CO— or a single bond, and,

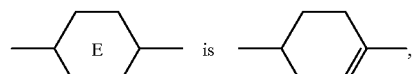

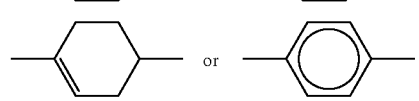

and/or at least one compound selected from Group B2 consisting of compounds of the formulae B1V to B1VII:

B1V

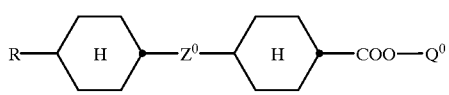

B1VI

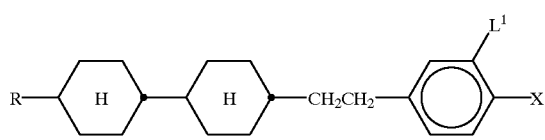

B1VII

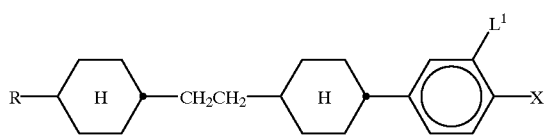

in which
R is as defined above,
$Z^0$ is —COO—, —CH$_2$CH$_2$— or a single bond,
$Q^0$ is

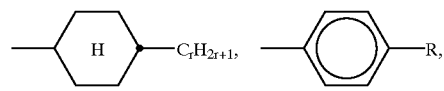

or 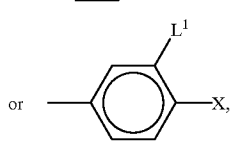

where r is 1–9,
X is CN or F,
$L^1$ is H or F, and/or at least one compound selected from Group B3 consisting of compounds of the formulae B1VIII, B1IX and B1X:

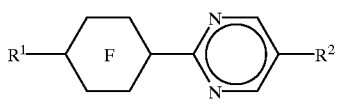 B1VIII

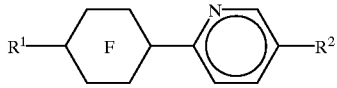 B1IX

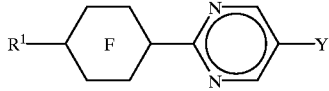 B1X in which $R^1$ and $R^2$, independently of one another, are as defined for R, Y is F or Cl, and

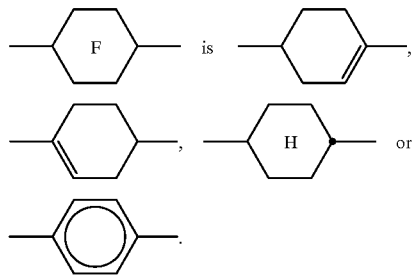

In a particularly preferred embodiment, the novel mixtures comprise from about 5 to 35%, in particular from 10 to 20%, of liquid-crystalline tolan compounds. This enables smaller layer thicknesses (about 5–6 μm) to be used, significantly shortening the response times. Particular preference is given to mixtures comprising one or more compounds selected from Group T consisting of the compounds of the formulae T1 to T3:

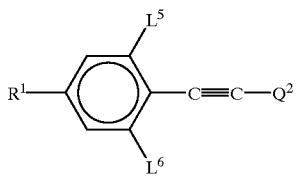 T1

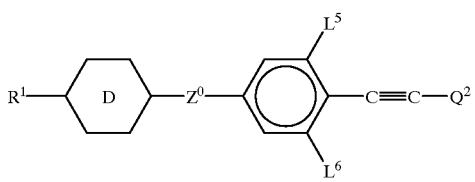 T2

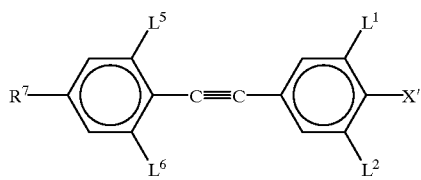 T3 in which $Q^2$ is

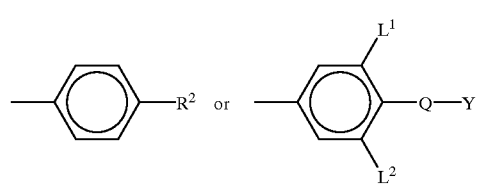

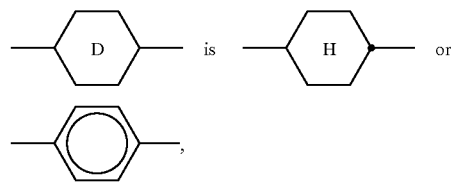

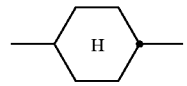, preferably

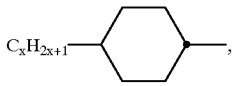

$L^1$, $L^2$, $L^5$ and $L^6$ are each, independently of one another, H or F

Q is —$CF_2$—, —CHF—, —$OCF_2$—, —OCHF— or a single bond,

Y is F or Cl, $Z^0$ is —CO—O—, —$CH_2CH_2$— or single bond, and $R^1$ and $R^2$ are each, independently of one another, as defined for R, $R^7$ is —$C_xH_{2x-1}$, —$OC_xH_{2x+1}$,

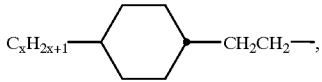, x is an integer from 1 to 15, and

X' is F, Cl or $OCF_3$.

The proportion of compounds from the group T is preferably from 5 to 30%, in particular from 5 to 20%.

Component B preferably comprises one or more compounds of the formulae X to XIII:

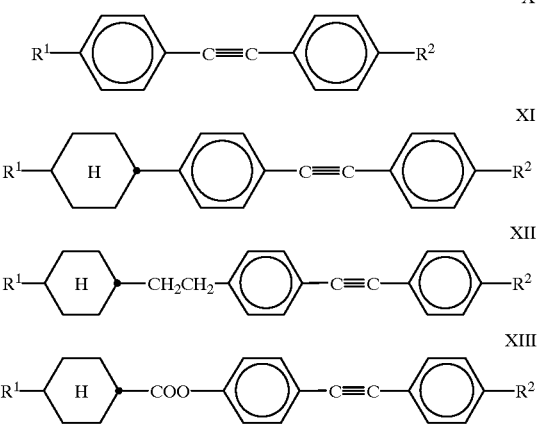

in which
R$^1$ and R$^2$ are each, independently of one another, as defined for R.

Preferred tolans of component B are compounds selected from the group consisting of Xa to XIIIa

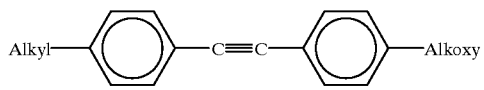

Xa

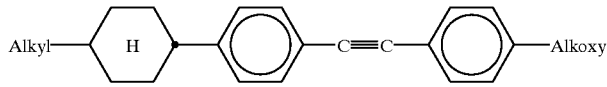

XIa

XIIa

XIIIa in which Alkyl and Alkoxy are a straight-chain alkyl or alkoxy radical having 1 to 7 carbon atoms.

The proportion of compounds from group B1 is preferably from about 10 to 50%, in particular from 15 to 40%. Compounds of the formula B1III and B1IV are preferred.

Particularly preferred compounds of the formula B1III are those of the following subformulae B1IIIa and B1IIIb

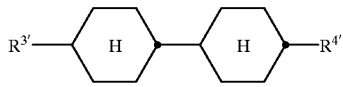

B1IIIa

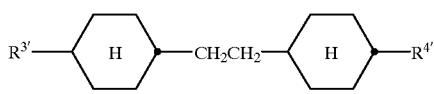

B1IIIb in which
R$^{3'}$ is CH$_3$—(CH$_2$)$_o$—, CH$_3$—(CH$_2$)$_o$—O—, CH$_3$—(CH$_2$)$_P$—, trans-H-(CH$_2$)$_q$—CH=CH—(CH$_2$CH$_2$)$_b$— CH$_2$O— or trans-H-(CH$_2$)$_q$—CH=CH—(CH$_2$CH$_2$)$_b$—, CH$_3$—(CH$_2$)$_0$—O—CH$_2$—,
R$^{4'}$ is CH$_3$—(CH$_2$)$_p$—,
o is 1, 2, 3 or 4,
q is 0, 1, 2 or 3,
b is 0 or 1, and
p is 1, 2, 3 or 4.

Particular preference is given to compounds of the formula B1IIIa in which R3' is trans-H-(CH$_2$)$_q$—CH=CH— and the formula B1III in which one of the radicals R$^{3'}$ or R$^{4'}$ is O—(CH$_2$)$_o$—CH$_3$ or CH$_2$—O—(CH$_2$)$_o$—CH$_2$—.

Preference is furthermore given to the compounds of the subformula

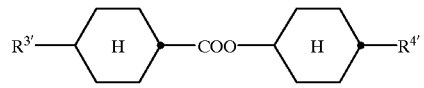

in which R$^{3'}$ and R$^{4'}$ are each, independently of one another, as defined above.

The proportion of compounds of the formula B1III of the abovementioned subformulae is preferably from about 5 to 45%, particularly preferably from about 10% to 35%. Particularly preferred compounds of the formula B1IV are those of the following subformula

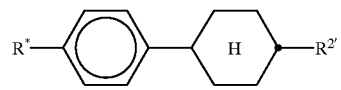

in which
R* is CH$_3$—(CH$_{2o}$)—O— or trans -H-(CH$_2$)$_q$—CH=CH—(CH$_2$CH$_2$)$_b$—CH$_2$O—, and
R$^{2'}$ is CH$_3$—(CH$_2$)$_p$—, where
o is 0, 1, 2, 3 or 4,
q is 0, 1, 2 or 3,
b is 0 or 1, and
p is 1, 2, 3 or 4.

The proportion of these compounds or of compounds of the formula BIV is preferably from about 5 to 40%, particularly preferably from about 10 to 35%.

In a particularly preferred embodiment, the mixtures simultaneously comprise compounds of the formulae B1III and B1IV, where the total proportion of components from group B1 remains observed.

If compounds of the formulae B1I and B1III are present, $R^1$ and $R^2$ are preferably each, independently of one another, n-alkyl having 1 to 7 carbon atoms or (trans)-n-alkenyl having 3 to 7 carbon atoms. Z is preferably a single bond.

Preference is furthermore given to novel mixtures which comprise one or more compounds of the formula B1IV in which

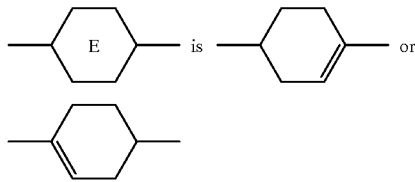

and $R^1$ and $R^2$ have one of the preferred meanings given above, particularly preferably n-alkyl having 1 to 7 carbon atoms.

In all cases, the total proportion of components from group B1 remains observed.

The proportion of compounds from group B2 is preferably from about 5 to 45%, in particular from 5 to 20%. The proportion (preferred ranges) for B1V to B1VII is as follows:

B1V: from about 5 to 30%, preferably from about 5 to 15%
Sum of B1VI
and B1VII: from about 5 to 25%, preferably from about 10 to 20%.

Preferred compounds from group B2 are shown below:

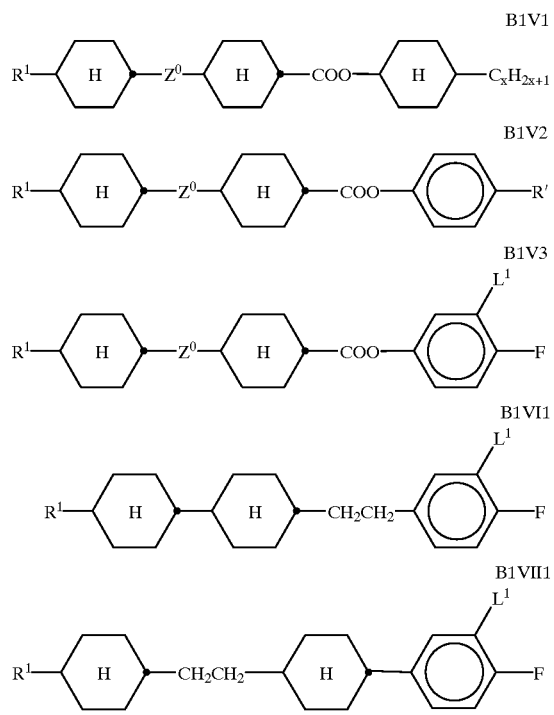

$R^1$ is preferably n-alkyl having 1 to 7 carbon atoms or (trans)-n-alkenyl having 2 to 7 carbon atoms. $Z^0$ is preferably a single bond. $R'$ preferably has the preferred meaning given above for R or is fluorine. $L^1$ is preferably fluorine, x is 1–15.

The novel mixtures preferably comprise one or more compounds selected from the group consisting of B1V3, B1VI1 and B1VII1 in a total proportion of from about 5 to 35%.

In a particularly preferred embodiment, the novel mixtures, in addition to B1V3, B1VI1 and B1VII1 ($L^1$=F), comprise further terminally fluorinated compounds selected, for example, from the group consisting of

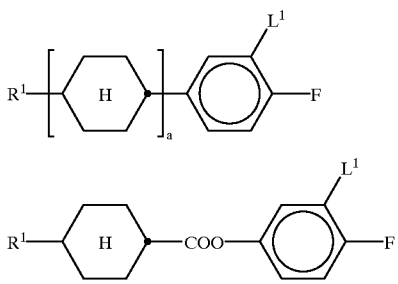

and/or polar heterocyclic compounds selected from the group consisting of

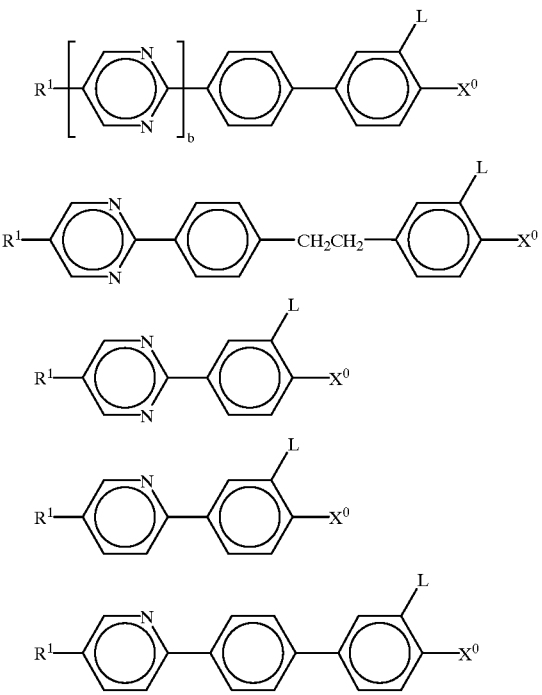

in which $R^1$ is preferably n-alkyl having 1 to 7 carbon atoms or (trans)-n-alkenyl having 2 to 7 carbon atoms, a is 1 or 2, b is 0 or 1, $X^o$ is F, Cl, $CF_3$, —$OCF_3$ or —$OCHF_2$, and L is H or F.

The total proportion of all terminally fluorinated compounds is preferably from about 5 to 65%, in particular from about 15 to 40%.

The proportion of compounds from group B3 is preferably from about 5 to 30%, particularly preferably from about 10 to 20%. $R^1$ is preferably n-alkyl or n-alkoxy, in each case having 1 to 9 carbon atoms.

However, it is also possible to use analogous compounds containing alkenyl or alkenyloxy groups. Compounds of the formula B1VIII are preferred.

The novel mixtures comprise compounds of the formulae IA and IB and preferably compounds from at least one of groups B1, B2 and B3. They preferably comprise one or more compounds from group B1 and one or more compounds from group B2 and/or B3.

The proportion of compounds of component C is preferably from 0 to 20%, in particular from 0 to 10%.

Further particularly preferred embodiments are given below:

Component C comprises, e.g., one or more compounds containing a 1-cyano-trans-1,4-cyclohexyl group or a 2,3-difluoro-1,4-phenylene group at least two compounds of the formulae AIII or AV compounds of the formulae AIII and AV at least one compound from the group consisting of:

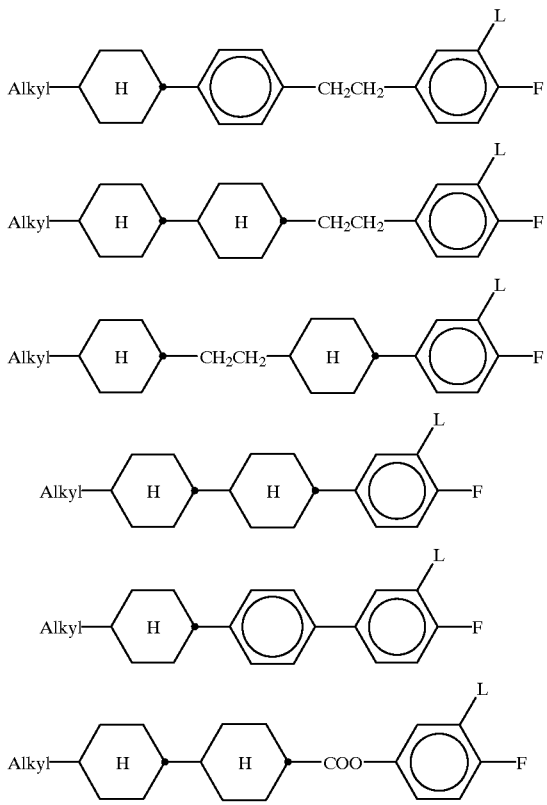

in which Alkyl is a straight-chain alkyl or alkoxy radical having 2 to 7 carbon atoms, and L is H or F;

one or more compounds in which R is a trans-alkenyl group or a trans-alkenyloxy group;

one or more compounds selected from the following group:

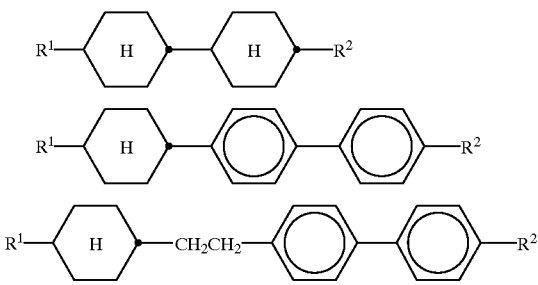

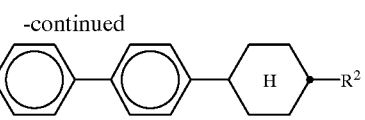

in which $R^1$ and $R^2$ have the preferred meanings given under compounds of component B. The 1,4-phenylene groups in the abovementioned compounds can also be substituted by fluorine. The proportion of these compounds in the liquid-crystal mixtures is from 0 to 25%, preferably from 5 to 15%.

In a further preferred embodiment, the mixtures comprise
one or more, in particular 1, 2, 3 or 4, compounds selected from the compounds of the formulae IIb, IIId, IIIf, IIIh and IIIi;

at least two compounds selected from the compounds of the formulae IIa1, IIb1 and IIb2;

one or more compounds of the formula B1IV;

one or more compounds of the formula T1 to T2;

one or more compounds of the formulae

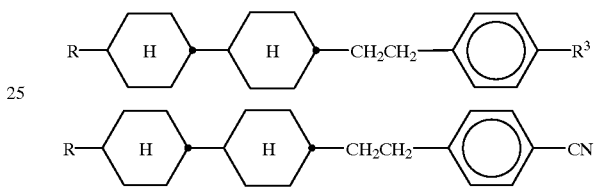

in which R is as defined under the formula III.

In a preferred embodiment, the novel liquid-crystalline media comprise 3, 4, 5 or 6 compounds of the formula IA and/or IB; the content of these compounds is generally from 10 to 60% by weight, preferably from 15 to 50% by weight, based on the overall mixture.

Media comprising compounds of the formula IB in which $R^b$ is 1E-alkenyl or 3E-alkenyl are particularly preferred. $R^b$ is in particular $CH_2=CH-$ or $CH_3-CH=CH-$.

In particular when use din SLCDs and TN displays having high layer thicknesses, the novel mixtures are distinguished by very low overall response times ($=t_{on}+t_{off}$).

Low overall response times are an important criterion, in particular, in SLCDs for use as displays in laptops in order to be able to display cursor movements without interference.

The liquid-crystal mixtures used in the STN and TN cells according to the invention are dielectrically positive with $\Delta\epsilon \geq 1$. Particular preference is given to liquid-crystal mixtures where $\Delta\epsilon \geq 3$ and very particularly to those where $\Delta\epsilon \geq 5$.

The liquid-crystal mixtures according to the invention have favourable values for the threshold voltage $V_{10/0/20}$ and for the flow viscosity v. If the value for the optical path difference d.Δn is specified, the value for the layer thickness d is determined by the optical anisotropy Δn. In particular at relatively high values for d.Δn, the use of liquid-crystal mixtures according to the invention having a relatively high value for the optical anisotropy is generally preferred since the value for d can then be chosen to be relatively small, which results in more favourable values for the response times. However, liquid-crystal displays according to the invention which contain liquid-crystal mixtures according to the invention having relatively small values for Δn are also characterized by advantageous values for the response times. The liquid-crystal mixtures according to the invention are furthermore characterized by advantageous values for the steepness of the electrooptical characteristic line and can be operated at high multiplex rates. In addition, the liquid-crystal mixtures according to the invention have high stability and favourable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode baseplates and electrodes with a surface treatment such that the preferential alignment (director) of the liquid-crystal molecules in each case adjacent thereto is usually twisted by a value of from 160° to 720° from one electrode to the next, corresponds to the structure which is conventional for display elements of this type. The term conventional structure here is broadly drawn and also includes all derivatives and modifications of the TN and STN cell, in particular also matrix display elements, and display elements which contain additional magnets. The surface tilt angle at the two outer plates may be identical or different. Identical tilt angles are preferred. Preferred TN displays have pretilt angles between the longitudinal axis of the molecules at the surface of the outer plates and the outer plates of from 0° to 7°, preferably from 0.01° to 5°, in particular from 0.1 to 2°. In STN displays, the pretilt angle is from 1° to 30°, preferably from 1° to 12°, in particular from 3° to 8°.

The twist angle of the TN mixture in the cell has a value of between 22.5° and 170°, preferably between 45° and 130°, in particular between 80° and 115°. The twist angle of the STN mixture in the display from alignment layer to alignment layer has a value of between 100° and 600°, preferably between 170° and 270°, in particular between 180° and 250°.

The liquid-crystal mixtures which can be used according to the invention are prepared in a manner which is known per se. In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

The examples below are intended to illustrate the invention without representing a limitation.

The following abbreviations are used:
S-N smectic-nematic phase transition temperature,
N-I nematic-isotropic phase transition temperature,
c.p. clearing point,
$t_{on}$ time from switching on until 90% of the maximum contrast is achieved,
$t_{off}$ time from switching off until 10% of the maximum contrast is achieved,
$V_{90}/V_{10}$ steepness,
$t_{ave}$ $$\frac{t_{on} + t_{off}}{2}$$

(average response time).

The SLCD is operated in multiplex mode (multiplex ratio 1:240, bias 1:16, operating voltage 10 volts, so that $t_{on}=t_{off}$).

Above and below, all temperatures are indicated in ° C. The percentages are percent by weight. The values for the response times and viscosities relate to 20° C.

In the present application and in the examples below, the structures of the liquid-crystal compounds are indicated by acronyms, the transformation into chemical formulae taking place in accordance with tables A and B below. All radicals $C_nH_{2n+1}$ and $C_mH_{2m+1}$ are straight-chain alkyl radicals having n and m carbon atoms respectively. The alkenyl radicals have the trans configuration. The coding in Table B is self-evident. In Table A, only the acronym for the parent structure is given. In individual cases, the acronym for the parent structure is followed, separated by a dash, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^4$ | $L^2$ | $L^5$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | H | F |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | H | F |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| nOCF$_2$ | $C_nH_{2n+1}$ | OCHF$_2$ | H | H | H |
| nS | $C_nH_{2n+1}$ | NCS | H | H | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |
| nNF | $C_nH_{2n+1}$ | CN | H | F | H |
| nAm | $C_nH_{2n+1}$ | $COOC_mH_{2m+1}$ | H | H | H |
| nF.Cl | $C_nH_{2n+1}$ | Cl | H | H | F |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |
| nV-m | $C_nH_{2n+1}$—CH=CH— | —$C_mH_{2m+1}$ | H | H | H |
| nV-N | $C_nH_{2n+1}$—CH=CH— | —CN | H | H | H |
| nV-F | $C_nH_{2n+1}$—CH=CH— | F | H | H | H |
| nV-F.F | $C_nH_{2n+1}$—CH=CH— | F | H | H | F |
| n-2Vm | $C_nH_{2n+1}$ | $C_mH_{2m+1}$—CH=CH—$CH_2CH_2$— | H | H | H |

The TN and STN displays preferably contain liquid-crystalline mixtures composed of one or more compounds from Tables A and B.
TABLE A
($L^1$, $L^2$, $L^3$ = H or F)
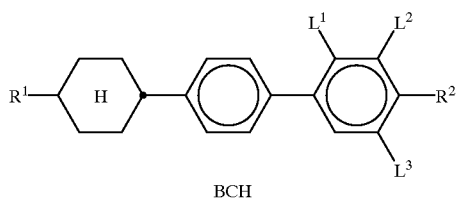
BCH
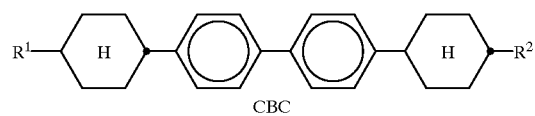
CBC
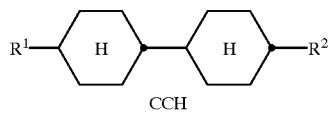
CCH
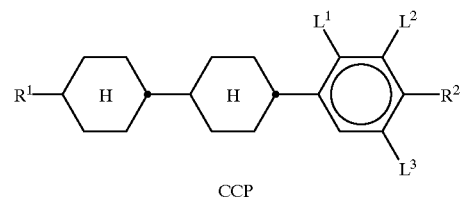
CCP
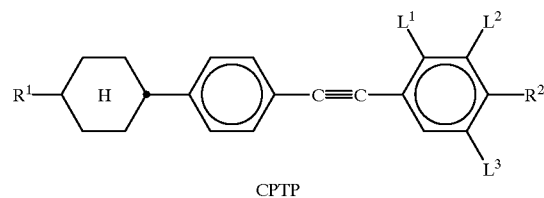
CPTP
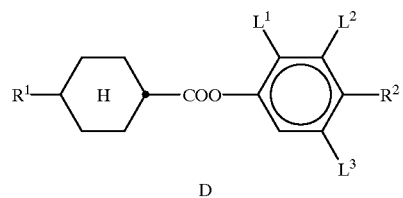
D
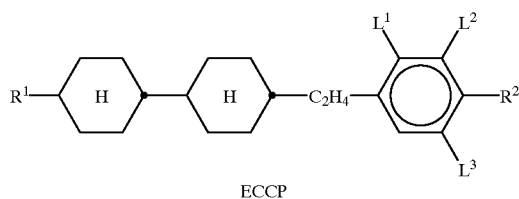
ECCP
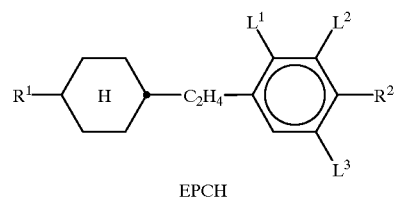
EPCH
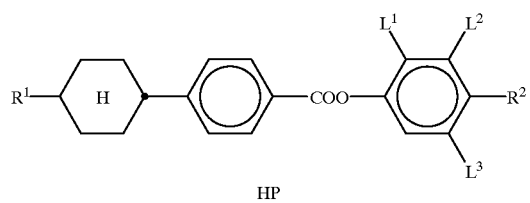
HP
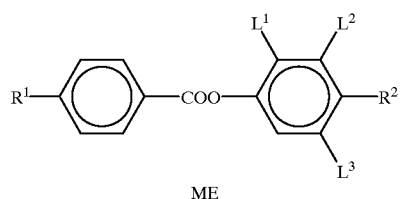
ME
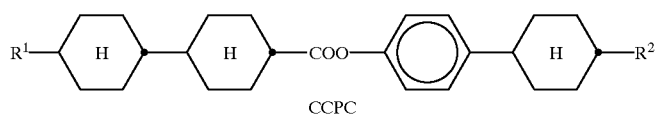
CCPC
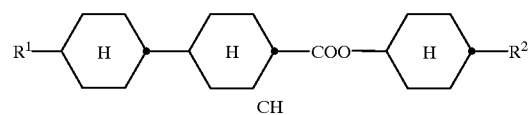
CH TABLE A-continued
($L^1$, $L^2$, $L^3$ = H or F)
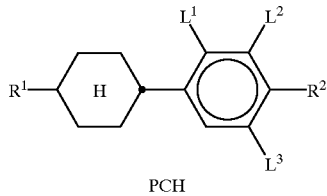
PCH
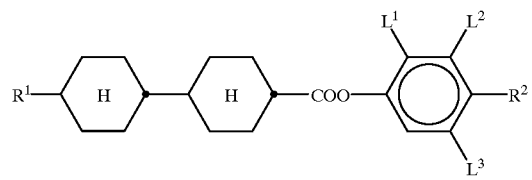
CP
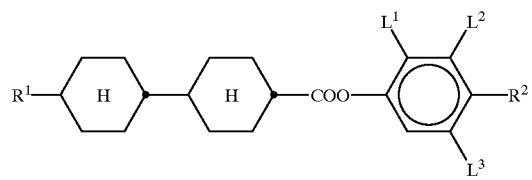
PYP-nF
TABLE B
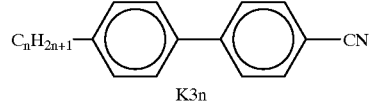
K3n
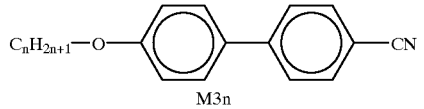
M3n
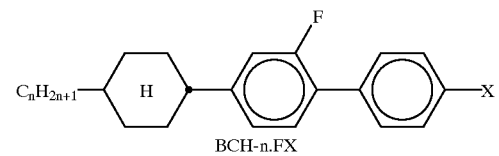
BCH-n.FX
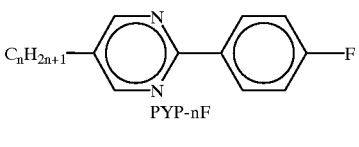
PYP-nF
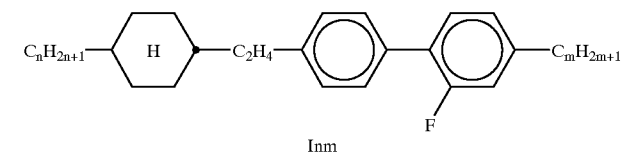
Inm
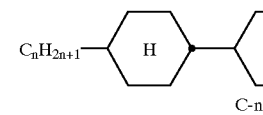
C-nm
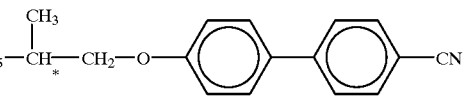
C15
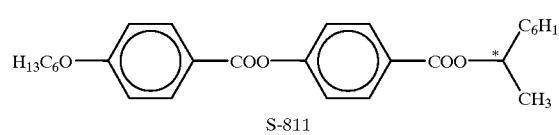
S-811
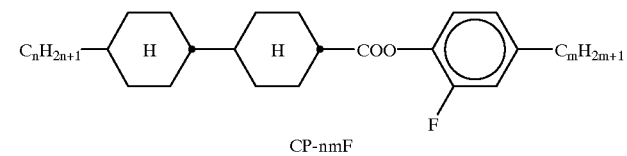
CP-nmF
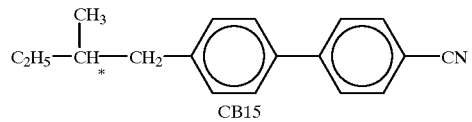
CB15
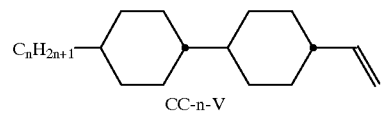
CC-n-V

TABLE B-continued

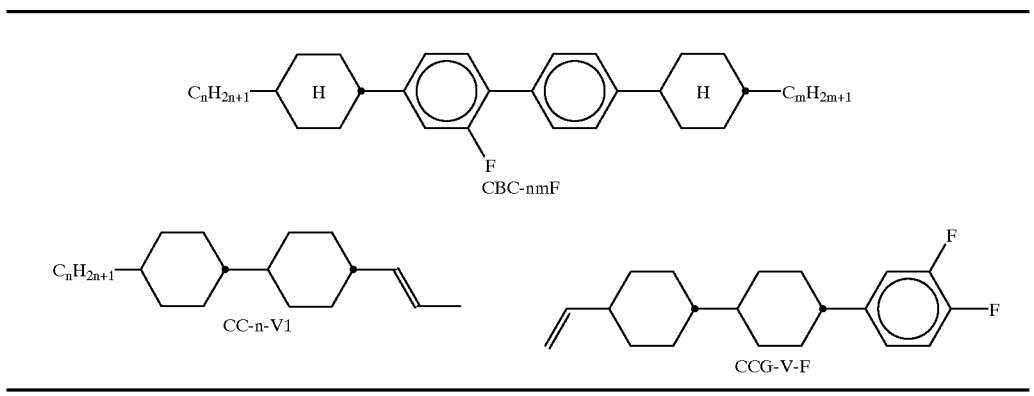

The examples below are intended to illustrate the invention without representing a limitation. Above and below, percentages are percent by weight. All temperatures are given in degrees celcius. m.p. denotes melting point, c.p.=clearing point. Furthermore, C=crystalline state, N=nematic phase, S=smectic phase and I=isotropic phase. The numbers between these symbols are the transition temperatures. Δn denotes optical anisotropy (589 nm, 20° C.), and the viscosity (mm²/sec) was determined at 20° C.

The entire disclosure of all applications, patents and publications, cited above and below, and of corresponding German application No. 196 44 042.4, filed Oct. 31, 1996 is hereby incorporated by reference.

EXAMPLE 1

An STN mixture comprising

| PCH-3 | 20.0% | S→N: | <−40° C. |
|---|---|---|---|
| ME2N.F | 3.0% | Clearing point: | +114.0° C. |
| PCH-301 | 10.0% | Δn [589 nm; 20° C.]: | +0.1691 |
| PTP-102 | 5.0% | HTP (S-811): | −9.9 |
| PTP-201 | 5.0% | Twist: | 180° |
| CPTP-301 | 6.0% | $V_{(10,0,20)}$: | 2.30 V |
| CPTP-302 | 6.0% | d/p: | 0.45 |
| CPTP-303 | 6.0% | d · Δn: | 0.95 |
| CPTP-30CF$_3$ | 4.0% | | |
| CPTP-50CF$_3$ | 4.0% | | |
| CCP-20CF$_3$ | 4.0% | | |
| CCP-30CF$_3$ | 4.0% | | |
| CP-33F | 4.0% | | |
| CBC-33F | 4.0% | | |
| CBC-53F | 4.0% | | |
| CC-5-V | 11.0% | | |

EXAMPLE 2

A TN mixture comprising

| ME2N.F | 2.0% | S→N: | <−40° C. |
|---|---|---|---|
| ME3N.F | 2.0% | Clearing point: | +115.0° C. |
| ME4N.F | 2.0% | Δn [569 nm; 20° C.]: | +0.0891 |
| ME5N.F | 2.0% | Twist: | 90° |
| PYP-5F | 8.0% | $V_{(10,0,20)}$: | 2.29 V |
| CCH-301 | 16.0% | d · Δn: | 0.5 |
| CC-5-V | 13.0% | | |
| BCH-3F.F | 8.0% | | |
| CH-33 | 4.0% | | |

| CC-35 | 4.0% |
|---|---|
| CH-43 | 4.0% |
| CH-45 | 4.0% |
| CP-33F | 6.0% |
| CP-35F | 6.0% |
| CP-55F | 6.0% |
| CCPC-33 | 5.0% |
| CCPC-34 | 4.0% |
| CCPC-35 | 4.0% |

EXAMPLE 3

A TN mixture comprising

| ME2N.F | 2.2% | S→N: | <−40° C. |
|---|---|---|---|
| ME3N.F | 1.7% | Clearing point: | +109.0° C. |
| ME4N.F | 3.1% | Δn [589 nm; 20° C.]: | +0.0992 |
| PYP-5F | 8.0% | Twist: | 90° |
| CCH-301 | 10.0% | $V_{(10,0,20)}$: | 2.29 V |
| CCH-303 | 6.0% | | |
| CCH-501 | 4.0% | | |
| PCH-301 | 3.9% | | |
| BCH-3F.F | 9.0% | | |
| CC-5-V | 13.0% | | |
| CP-33F | 5.0% | | |
| CP-3SF | 5.0% | | |
| CP-5SF | 5.0% | | |
| CH-33 | 4.0% | | |
| CBC-33 | 4.0% | | |
| CBC-53 | 2.0% | | |
| CBC-55 | 3.0% | | |
| CBC-33P | 3.0% | | |
| CCPC-33 | 2.0% | | |
| CCPC-34 | 4.0% | | |
| CCPC-35 | 2.0% | | |

EXAMPLE 4

An STN mixture comprising

| PCH-3 | 27.0% | S→N: | <−20° C. |
|---|---|---|---|
| CC-5-V | 8.0% | Clearing point: | +83.0° C. |
| ME2N.F | 4.0% | Δn [589 nm; 20° C.]: | +0.1529 |
| ME3N.F | 3.0% | HTP (S-811): | −11.5 |
| ME4N.F | 10.0% | Twist: | 220° |
| ME5N.F | 9.0% | $V_{(10,0,20)}$: | 1.35 V |

| -continued | | | |
|---|---|---|---|
| CPTP-30CF$_3$ | 6.0% | d/p: | 0.5 |
| CPTP-50CF$_3$ | 7.0% | d · Δn: | 0.9 |
| CCP-20CF$_3$ | 3.0% | | |
| CP-33F | 5.0% | | |
| CP-35F | 5.0% | | |
| PTP-102 | 2.0% | | |
| PTP-201 | 3.0% | | |
| CPTP-302 | 2.0% | | |
| CBC-33 | 3.0% | | |
| CBC-53 | 3.0% | | |

EXAMPLE 5

| PCH-3 | 20.0% | S→N: | <−40° C. |
|---|---|---|---|
| ME2N.F | 3.0% | Clearing point: | +114.0° C. |
| PCH-301 | 10.0% | Δn [589 nm; 20° C.]: | +0.1691 |
| PTP-102 | 5.0% | HTP (S-811): | −9.9 |
| PTP-201 | 5.0% | Twist: | 180° |
| CPTP-301 | 6.0% | V$_{(10,0,20)}$: | 2.30 V |
| CPTP-302 | 6.0% | d/p: | 0.45 |
| CPTP-303 | 6.0% | d · Δn: | 0.95 |
| CPTP-30CF$_3$ | 6.0% | | |
| CPTP-50CF$_3$ | 4.0% | | |
| CCP-20CF$_3$ | 4.0% | | |
| CCP-30CF$_3$ | 4.0% | | |
| CP-33F | 4.0% | | |
| CBC-33F | 4.0% | | |
| CBC-53F | 4.0% | | |
| CC-5V | 11.0% | | |

EXAMPLE 6

A TN mixture comprising

| ME2N.F | 2.0% | S→N: | <−40° C. |
|---|---|---|---|
| ME3N.F | 2.0% | Clearing point: | +107.5° C. |
| ME4N.F | 3.0% | Δn [589 nm; 20° C.]: | +0.0995 |
| PYP-5F | 7.0% | Twist: | 90° |
| CCC-301 | 10.0% | V$_{(10,0,20)}$: | 2.37 V |
| CCH-303 | 6.0% | d · Δn: | 0.5 |
| CCH-501 | 6.0% | | |
| PCH-301 | 5.0% | | |
| BCH-3F.F | 9.0% | | |
| CC-5-V | 12.0% | | |
| CP-33F | 5.0% | | |
| CP-35F | 5.0% | | |
| CP-55F | 5.0% | | |
| CH-33 | 3.0% | | |
| CBC-33 | 4.0% | | |
| CBC-53 | 4.0% | | |
| CBC-55 | 3.0% | | |
| CBC-33F | 3.0% | | |
| CCPC-33 | 2.0% | | |
| CCPC-34 | 2.0% | | |
| CCPC-35 | 2.0% | | |

EXAMPLE 7

An STN mixture comprising

| ME2N.F | 5.0% | S→N: | <−30° C. |
|---|---|---|---|
| ME3N.F | 5.0% | Clearing point: | +90.0° C. |
| ME4N,F | 9.0% | Δn [569 nm; 20° C.]: | +0.1209 |
| ME5N.F | 10.0% | Twist: | 220° |
| ME7N.F | 10.0% | V$_{(10,0,20)}$: | 1.09 V |

| -continued | | | |
|---|---|---|---|
| HP-3N.F | 5.0% | | |
| HP-4N.F | 5.0% | | |
| HP-5N.F | 5.0% | | |
| CCH-301 | 13.0% | | |
| CC-5-V | 18.0% | | |
| CCPC-33 | 5.0% | | |
| CCPC-34 | 5.0% | | |
| CCPC-35 | 5.0% | | |

EXAMPLE 8

A TN mixture comprising

| ME2N.F | 2.0% | S→N: | <−40° C. |
|---|---|---|---|
| ME3N.F | 2.0% | Clearing point: | +109.5° C. |
| ME4N.F | 3.5% | Δn [589 nm; 20° C.]: | +0.0996 |
| PYP-5F | 8.0% | Twist: | 90° |
| CCH-301 | 10.0% | V$_{(10,0,20)}$: | 2.31 V |
| CCH-303 | 6.0% | | |
| CCH-501 | 4.0% | | |
| PCH-301 | 3.5% | | |
| BCH-3F.F | 9.0% | | |
| CC-5-V | 13.0% | | |
| CP-33F | 5.0% | | |
| CP-35F | 5.0% | | |
| CP-55F | 5.0% | | |
| CH-33 | 4.0% | | |
| CBC-33 | 4.0% | | |
| CBC-53 | 2.0% | | |
| CBC-55 | 3.0% | | |
| CBC-33F | 3.0% | | |
| CCPC-33 | 2.0% | | |
| CCPC-34 | 4.0% | | |
| CCPC-35 | 2.0% | | |

EXAMPLE 9

A TN mixture comprising

| ME2N.F | 2.0% | S→N: | <−40° C. |
|---|---|---|---|
| ME3N.F | 2.0% | Clearing point: | +15.0° C. |
| ME4N.F | 2.0% | Δn [599 nm; 20° C.]: | +0.0891 |
| ME5N.F | 2.0% | Twist: | 90° |
| PYP-5F | 8.0% | V$_{(10,0,20)}$: | 2.29 V |
| CCH-301 | 16.0% | | |
| CC-5-V | 13.0% | | |
| BCH-3F.F | 8.0% | | |
| CH-33 | 4.0% | | |
| CH-35 | 4.0% | | |
| CH-43 | 4.0% | | |
| CH-45 | 4.0% | | |
| CP-33F | 6.0% | | |
| CP-35F | 6.0% | | |
| CP-55F | 6.0% | | |
| CCPC-33 | 5.0% | | |
| CCPC-34 | 4.0% | | |
| CCPC-35 | 4.0% | | |

EXAMPLE 10

An STN mixture comprising

| ME2N.F | 3.0% | S→N: | <−40° C. |
|---|---|---|---|
| ME3N.F | 3.0% | Clearing point: | +82.5° C. |
| ME4N.F | 5.0% | Δn [589 nm; 20° C.]: | +0.1183 |

-continued

| | | | |
|---|---|---|---|
| ME5N.F | 5.0% | HTP (S-811): | −10.7 |
| PCH-301 | 11.0% | Twist: | 220° |
| CC-5-V | 18.0% | $V_{(10,0,20)}$: | 1.94 V |
| PTP-102 | 4.0% | | |
| PTP-201 | 4.0% | | |
| CCP-20CF$_3$ | 5.0% | | |
| CCP-30CF$_3$ | 6.0% | | |
| ECCP-3F.F | 5.0% | | |
| ECCP-5F.F | 5.0% | | |
| BCH-3F.F | 9.0% | | |
| CP-33F | 5.0% | | |
| CP-35F | 5.0% | | |
| CP-55F | 5.0% | | |
| CPTP-302 | 2.0% | | |

EXAMPLE 11

An STN mixture comprising

| | | | |
|---|---|---|---|
| PCH-3 | 8.0% | S→N: | <−40° C. |
| ME2N.F | 3.0% | Clearing point: | +85.5° C. |
| ME3N.F | 3.0% | Δn [589 nm; 20° C.]: | +0.1598 |
| ME4N.F | 6.0% | HTP (S-811): | −10.8 |
| PCH-301 | 18.0% | Twist: | 220° |
| CC-5-V | 14.0% | $V_{(10,0,20)}$: | 1.99 V |
| PTP-102 | 5.0% | | |
| PTP-201 | 5.0% | | |
| BCH-3F.F | 9.0% | | |
| CP-33F | 6.0% | | |
| CPTP-301 | 6.0% | | |
| CPTP-302 | 5.0% | | |
| CPTP-303 | 3.0% | | |
| CPTP-30CF$_3$ | 5.0% | | |
| CPTP-50CF$_3$ | 4.0% | | |

EXAMPLE 12

A TN mixture comprising

| | | | |
|---|---|---|---|
| ME2N.F | 2.2% | S→N: | <−40° C. |
| ME3N.F | 1.7% | Clearing point: | +109.0° C. |
| ME4N.F | 3.1% | Δn [599 nm; 20° C.]: | +0.0992 |
| PYP-5F | 8.0% | Twist: | 90° |
| CCH-301 | 10.0% | $V_{(10,0,20)}$: | 2.29 V |
| CCH-303 | 6.0% | | |
| CCH-501 | 4.0% | | |
| PCH-301 | 3.9% | | |
| BCH-3F.F | 9.0% | | |
| CC-5-V | 13.0% | | |
| CP-33F | 5.0% | | |
| CP-35F | 5.0% | | |
| CP-SSF | 5.0% | | |
| CH-33 | 4.0% | | |
| CBC-33 | 4.0% | | |
| CBC-53 | 2.0% | | |
| CBC-55 | 3.0% | | |
| CBC-33F | 3.0% | | |
| CCPC-33 | 2.0% | | |
| CCPC-34 | 4.0% | | |
| CCPC-35 | 2.0% | | |

EXAMPLE 13

An STN mixture comprising

| | | | |
|---|---|---|---|
| K6 | 5.0% | S→N: | <−40° C. |
| ME2N.F | 3.0% | Clearing point: | +86.0° C. |
| ME3N.F | 3.0% | Δn [589 nm; 20° C.]: | +0.1599 |
| ME4N.F | 7.0% | HTP (S-811): | −10.6 |
| PCH-301 | 17.0% | Twist: | 220° |
| CC-5-V | 16.0% | $V_{(10,0,20)}$: | 1.99 V |
| PTP-102 | 5.0% | | |
| PTP-201 | 5.0% | | |
| BCH-3F.F | 8.0% | | |
| CP-33F | 5.0% | | |
| CP-35F | 5.0% | | |
| CPTP-301 | 4.0% | | |
| CPTP-302 | 5.0% | | |
| CPTP-303 | 4.0% | | |
| CPTP-30CF$_3$ | 4.0% | | |
| CPTP-50CF$_3$ | 4.0% | | |

EXAMPLE 14

An STN mixture comprising

| | | | |
|---|---|---|---|
| ME2N.F | 4.0% | S→N: | <−40° C. |
| ME3N.F | 4.0% | Clearing point: | +95.5° C. |
| ME4N.F | 6.0% | Δn [589 nm; 20° C.]: | +0.1073 |
| ME5N.F | 6.0% | HTP (CB-15): | −10.4 |
| PCH-301 | 9.0% | | |
| CC-5-V | 20.0% | | |
| CCP-20CF$_3$ | 7.0% | | |
| CCP-30CF$_3$ | 7.0% | | |
| ECCP-3F.F | 3.0% | | |
| ECCP-5F.F | 4.0% | | |
| BCH-3F.F | 4.0% | | |
| BCH-5F.F | 4.0% | | |
| CP-33F | 4.0% | | |
| CP-35F | 4.0% | | |
| CP-55F | 4.0% | | |
| CBC-33F | 4.0% | | |
| CBC-53F | 4.0% | | |
| CBC-55F | 2.0% | | |

EXAMPLE 15

An STN mixture comprising

| | | | |
|---|---|---|---|
| ME2N.F | 3.0% | S→N: | <−40° C. |
| ME3N.F | 3.0% | Clearing point: | +87.5° C. |
| ME4N.F | 5.0% | Δn [589 nm; 20° C.]: | +0.1215 |
| ME5N.F | 4.0% | HTP (S-811): | −10.6 |
| PCH-3 | 5.0% | Twist: | 220° |
| PCH-301 | 15.0% | $V_{(10,0,20)}$: | 2.06 V |
| CC-5-V | 18.0% | | |
| PTP-102 | 4.0% | | |
| CCP-30CF$_3$ | 5.0% | | |
| ECCP-3F.F | 5.0% | | |
| BCH-3F.F | 5.0% | | |
| CP-33F | 7.0% | | |
| CP-35F | 7.0% | | |
| CP-55F | 6.0% | | |
| CPTP-301 | 4.0% | | |
| CPTP-302 | 4.0% | | |

EXAMPLE 16

An STN mixture comprising

| | | | |
|---|---|---|---|
| ME2N.F | 6.0% | S→N: | <−40° C. |
| ME3N.F | 6.0% | Clearing point: | +95.5° C. |
| ME4N.F | 10.0% | Δn [589 nm; 20° C.]: | +0.1213 |
| ME5N.F | 10.0% | HTP (S-811): | −11.6 |
| ME7N.F | 7.0% | Mux: | 16 |
| HP-3N.F | 5.0% | Twist: | 220° |
| HP-4N.F | 5.0% | $V_{(10,0,20)}$: | 1.07 V |
| HP-5N.F | 5.0% | | |
| CCH-301 | 13.0% | | |
| CC-5-V | 18.0% | | |
| CP-33F | 4.0% | | |
| CCPC-33 | 4.0% | | |
| CCPC-34 | 4.0% | | |
| CCPC-35 | 3.0% | | |

EXAMPLE 17

An STN mixture comprising

| | | | |
|---|---|---|---|
| ME2N.F | 2.0% | S→N: | <−40° C. |
| ME3N.F | 3.0% | Clearing point: | 111.0° C. |
| PCH-3 | 20.0% | Δn [589 nm; 20° C.]: | +0.1310 |
| PCH-5 | 7.0% | HTP (S-811): | −10.3 |
| CC-5-V | 14.0% | Twist: | 240° |
| CCP-20CF$_3$ | 4.0% | $V_{(10,0,20)}$: | 2.29 V |
| CCP-30CF$_3$ | 6.0% | d/p: | 0.52 |
| CP-33F | 5.0% | d · Δn: | 0.87 |
| CP-35F | 5.0% | | |
| ECCP-3F.F | 6.0% | | |
| ECCP-5F.F | 6.0% | | |
| PTP-102 | 3.0% | | |
| CPTP-301 | 4.0% | | |
| CPTP-302 | 3.0% | | |
| CPTP-303 | 3.0% | | |
| CBC-33F | 5.0% | | |
| CBC-53F | 4.0% | | |

EXAMPLE 18

An STN mixture comprising

| | | | |
|---|---|---|---|
| ME2N.F | 2.0% | S→N: | <−40° C. |
| ME3N.F | 3.0% | Clearing point: | 109.5° C. |
| ME4N.F | 8.0% | Δn [589 nm; 20° C.]: | +0.1331 |
| PCH-3 | 22.0% | HTP (S-811): | −10.5 |
| CC-5-V | 17.0% | Twist: | 240° |
| CCP-20CF$_3$ | 4.0% | $V_{(10,0,20)}$: | 2.03 V |
| CCP-30CF$_3$ | 4.0% | d/p: | 0.52 |
| CP-33F | 5.0% | d · Δn: | 0.87 |
| CP-35F | 5.0% | | |
| ECCP-3F.F | 7.0% | | |
| CPTP-301 | 4.0% | | |
| CPTP-302 | 4.0% | | |
| CPTP-303 | 4.0% | | |
| CBC-33F | 5.0% | | |
| CBC-53F | 6.0% | | |

EXAMPLE 19

An STN mixture comprising

| | | | |
|---|---|---|---|
| ME2N.F | 2.0% | S→N: | <−40° C. |
| ME3N.F | 3.0% | Clearing point: | 109° C. |
| ME4N.F | 9.0% | Δn [589 nm; 20° C.]: | +0.1306 |
| PCH-3 | 20.0% | HTP (S-811): | −10.4 |
| CC-5-V | 18.0% | Twist: | 240° |
| CCP-20CF$_3$ | 4.0% | $V_{(10,0,20)}$: | 1.94 V |
| CCP-30CF$_3$ | 4.0% | | |
| CP-33F | 6.0% | | |
| CP-35F | 5.0% | | |
| ECCP-3F.F | 7.0% | | |
| CPTP-301 | 4.0% | | |
| CPTP-302 | 4.0% | | |
| CPTP-303 | 3.0% | | |
| CBC-33F | 5.0% | | |
| CBC-53F | 6.0% | | |

EXAMPLE 20

An STN mixture comprising

| | | | |
|---|---|---|---|
| PCH-3 | 12.0% | S→N: | <−40° C. |
| ME2N.F | 4.0% | Clearing point: | 91° C. |
| ME3N.F | 4.0% | Δn [589 nm; 20° C.]: | +0.1405 |
| ME4N.F | 14.0% | HTP (S-811) [1/μm]: | −11.3 |
| ME5N.F | 9.0% | d · Δn [μm]: | 0.95 |
| HP-3N.F | 5.0% | Twist: | 180° |
| HP-5N.F | 5.0% | $V_{(10,0,20)}$ [V]: | 1.18 |
| CC-5-V | 22.0% | $(V_{90}/V_{10} -1) \cdot 100[\%]$: | 8.47 |
| PTP-201 | 3.0% | | |
| CPTP-30CF$_3$ | 4.0% | | |
| CP-33F | 6.0% | | |
| CBC-33 | 4.0% | | |
| CBC-55 | 4.0% | | |

EXAMPLE 21

A TN mixture comprising

| | | | |
|---|---|---|---|
| ME2N.3 | 2.20% | S→N: | <−40° C. |
| ME3N.F | 1.72% | Clearing point: | +108° C. |
| ME4N.F | 4.04% | Δn [589 nm; 20° C.]: | +0.0993 |
| PYP-5F | 7.84% | Twist: | 90° |
| CCH-301 | 9.80% | $V_{(10,0,20)}$: | 2.26 V |
| CCH-303 | 5.88% | $V_{90}/V_{10}$: | 46.1% |
| CCH-501 | 3.92% | d · Δn [μm]: | 0.5 |
| PCH-301 | 3.82% | | |
| BCH-3F.F | 8.82% | | |
| CC-5-V | 12.74% | | |
| CP-33F | 4.90% | | |
| CP-35F | 4.90% | | |
| CP-55F | 4.90% | | |
| CH-33 | 3.92% | | |
| CBC-33 | 3.92% | | |
| CBC-53 | 1.96% | | |
| CBC-55 | 2.94% | | |
| CBC-33F | 2.94% | | |
| CCPC-33 | 1.96% | | |
| CCPC-34 | 3.92% | | |
| CCPC-35 | 1.96% | | |
| CCH-34 | 1.00% | | |

EXAMPLE 22

Two-bottle system

| Mixture I | | Mixture II | |
|---|---|---|---|
| ME2N.F | 3.0% | K6 | 5.0% |
| ME3N.F | 3.0% | ME2N.F | 3.0% |
| ME4N.F | 5.0% | ME3N.F | 3.0% |
| ME5N.F | 4.0% | ME4N.F | 7.0% |
| PCH-3 | 5.0% | PCH-301 | 17.0% |
| PCH-301 | 15.0 | CC-5-V | 16.0% |
| CC-5-V | 18.0% | PTP-102 | 5.0% |
| PTP-102 | 4.0% | PTP-201 | 5.0% |
| CCP-30CF$_3$ | 5.0% | BCH-3F.F | 8.0% |
| ECCP-3F.F | 5.0% | CP-33F | 5.0% |
| BCH-3F.F | 5.0% | CP-35F | 5.0% |
| CP-33F | 7.0% | CPTP-301 | 4.0% |
| CP-35F | 7.0% | CPTP-302 | 5.0% |
| CP-5SF | 6.0% | CPTP-303 | 4.0% |
| CPTP-301 | 4.0% | CPTP-30CF$_3$ | 4.0% |
| CPTP-302 | 4.0% | CPTP-50CF$_3$ | 4.0% |
| S→N: | <−40° C. | S→N: | <−40° C. |
| Clearing point: | 87.5° C. | Clearing point: | 86° C. |
| Δn [589 nm; 20° C.]: | +0.1215 | Δn [589 nm; 20° C.]: | +0.1599 |
| HTP (S-811) [1/μm]: | −10.5 | HTP (S-811) [1/μm]: | −10.5 |
| Twist: | 220° | Twist: | 220° |
| $V_{(10,0,20)}$ [V]: | 2.01 | $V_{(10,0,20)}$ [V]: | 2.01 |
| $(V_{90}/V_{10-1}) \cdot 100[\%]$: | 6.0 | $(V_{90}/V_{10-1}) \cdot 100[\%]$: | 6.0 |

EXAMPLE 23

| | | | |
|---|---|---|---|
| PCH-3N.F.F | 12.0% | S→N: | <−40° C. |
| PCH-5N.F.F | 10.0% | Clearing point: | +69.5° C. |
| PCH-3 | 20.0% | Δn [589 nm; 20° C.]: | +0.1202 |
| PCH-4 | 12.0% | Δε [kHz, 20° C.]: | 17.3 |
| K9 | 3.0% | Twist: | 90° |
| HP-3N.F | 4.0% | $V_{(10,0,20)}$: | 1.16 V |
| HP-4N.F | 3.0% | | |
| HP-5N.F | 3.0% | | |
| CC-5-V | 3.0% | | |
| CCG-V-F | 15.0% | | |
| CBC-33F | 3.0% | | |
| CBC-53F | 3.0% | | |
| CBC-55F | 3.0% | | |
| CBC-33 | 4.5% | | |

EXAMPLE 24

| | | | |
|---|---|---|---|
| PCH-3N.F.F | 10.0% | S→N: | <−40° C. |
| PCH-5N.F.F | 10.0% | Clearing point: | +67.5° C. |
| K6 | 7.0% | Δn [589 nm; 20° C.]: | +0.1509 |
| K9 | 7.0% | Δε [kHz, 20° C.]: | 17.7 |
| K12 | 7.0% | Twist: | 90° |
| PCH-3 | 20.0% | $V_{(10,0,20)}$: | 1.13 V |
| HP-3N.F | 3.0% | | |
| HP-4N.F | 3.0% | | |
| HP-5N.F | 2.0% | | |
| ME15 | 3.0% | | |
| PTP-102 | 4.0% | | |
| CCG-V-F | 7.0% | | |
| CBC-33F | 3.0% | | |
| CBC-53F | 3.0% | | |
| CBC-55F | 3.0% | | |
| CBC-33 | 2.0% | | |
| CBC-53 | 3.0% | | |
| CBC-55 | 3.0 | | |

EXAMPLE 25

| | | | |
|---|---|---|---|
| ME2N.F | 8.0% | S→N: | <−40° C. |
| ME3N.F | 9.0% | Clearing point: | 94.5 |
| ME4N.F | 10.0% | Δn [589 nm; 20° C.]: | +0.1328 |
| ME5N.F | 10.0% | HTP S-811: | −12.1 |
| PCH-3N.F.F | 10.0% | Twist: | 240° |
| CC-5-V | 6.0% | $V_{(10,0,20)}$: | 1.13 V |
| CCG-V-F | 15.0% | | |
| CCP-V-1 | 10.0% | | |
| CPTP-301 | 3.0% | | |
| CCPC-33 | 5.0% | | |
| CCPC-34 | 5.0% | | |
| CCPC-35 | 4.0% | | |
| CBC-33 | 5.0% | | |

EXAMPLE 26

| | | | |
|---|---|---|---|
| PCH-3N.F.F | 12.0% | S→N: | <−40° C. |
| PCH-5N.F.F | 10.0% | Clearing point: | +69.5 |
| PCH-3 | 20.0% | Δn [589 nm; 20° C.]: | +0.1202 |
| PCH-4 | 12.0% | Δε [kHz, 20° C.]: | 17.3 |
| K9 | 3.0% | Twist: | 90° |
| HP-3N.F | 4.0% | $V_{(10,0,20)}$: | 1.16 V |
| HP-4N.F | 3.0% | | |
| HP-5N.F | 3.0% | | |
| CC-5-V | 4.5% | | |
| CCG-V-F | 15.0% | | |
| CBC-33F | 3.0% | | |
| CBC-53F | 3.0% | | |
| CBC-55F | 3.0% | | |
| CBC-33 | 4.5% | | |

EXAMPLE 27

Four-bottle system

| Mixture I | | Mixture II | |
|---|---|---|---|
| ME2N.F | 9.0% | ME2N.F | 9.0% |
| ME3N.F | 9.0% | ME3N.F | 9.0% |
| ME4N.F | 10.0% | ME4N.F | 10.0% |
| ME5N.F | 8.0% | ME5N.F | 8.0% |
| PCH-3N.F.F | 10.0% | PCH-3N.F.F | 10.0% |
| CC-5-V | 6.0% | CCG-V-F | 13.0% |
| CCG-V-F | 16.0% | CCP-V-1 | 12.0% |
| CCP-V-1 | 11.0% | PTP-102 | 5.0% |
| CPTP-301 | 2.0% | CPTP-301 | 5.0% |
| CCPC-33 | 5.0% | CPTP-302 | 5.0% |
| CCPC-34 | 5.0% | CPTP-303 | 5.0% |
| CCPC-35 | 5.0% | CBC-33 | 3.0% |
| CBC-33 | 2.0% | CBC-53 | 2.0% |
| CBC-33F | 2.0% | CBC-33F | 2.0% |
| CBC-53F | 2.0% | CBC-53F | 2.0% |
| S→N: | <−40° C. | S→N: | <−40° C. |
| Clearing point: | +94.5° C. | Clearing point: | +94.0° C. |
| Visc. +20° C.: | 38 | Visc. +20° C.: | 43 |
| Δn [589 nm; 20° C.]: | 0.1292 | Δn [589 nm; 20° C.]: | 0.1700 |
| HTP (S-811): | −12.3 | HTP S-811: | −12.0 |
| Twist: | 240° | Twist: | 240° |
| $V_{(10,0,20)}$ [V]: | 1.14 | $V_{(10,0,20)}$ [V]: | 1.11 |
| $(V_{90}/V_{10-1}) \cdot 100[\%]$: | 5.3 | $(V_{90}/V_{20-1}) \cdot 100[\%]$: | 6.3 |

| Mixture III | | Mixture IV | |
|---|---|---|---|
| ME2N.F | 2.0% | ME2N.F | 2.0% |
| ME3N.F | 3.0% | ME3N.F | 3.0% |
| ME4N.F | 4.0% | ME4N.F | 4.0% |
| PCH-3N.F.F | 10.0% | PCH-3N.F.F | 10.0% |
| CC-5-V | 18.0% | CC-5-V | 9.0% |

-continued

| | | | |
|---|---|---|---|
| CCG-V-F | 24.0% | CCG-V-F | 19.0% |
| CCP-V-1 | 12.0% | CCP-V-1 | 13.0% |
| CCP-V2-1 | 6.0% | CCP-V2-1 | 4.0% |
| PTP-102 | 5.0% | PTP-102 | 5.0% |
| PTP-201 | 5.0% | PTP-201 | 5.0% |
| CPTP-301 | 4.0% | PTP-301 | 5.0% |
| CPTP-302 | 3.0% | PTP-302 | 5.0% |
| CCPC-33 | 4.0% | CPTP-301 | 5.0% |
| | | CPTP-302 | 5.0% |
| | | CPTP-303 | 5.0% |
| S→N: | <-40° C. | S→N: | <-40° C. |
| Clearing point: | +94.5° C. | Clearing point: | +95.0° C. |
| Visc. +20° C.: | 17 | Visc. +20° C.: | 20 |
| Δn [589 nm; 20° C.]: | 0.1286 | Δn [589 nm; 20° C.]: | 0.1697 |
| HTP (S-811): | -10.8 | HTP S-811: | -10.5 |
| Twist: | 240° | Twist: | 240° |
| $V_{(10,0,20)}$ [V]: | 1.96 | $V_{(10,0,20)}$ [V]: | 1.95 |
| $(V_{90}/V_{10-1}) \cdot 100[\%]$: | 5.1 | $(V_{90}/V_{10-1}) \cdot 100[\%]$: | 6.2 |

EXAMPLE 28

Two-bottle system

| Mixture I | | Mixture II | |
|---|---|---|---|
| ME2N.F | 10.0% | ME2N.F | 6.0% |
| ME3N.F | 10.0% | ME3N.P | 6.0% |
| ME4N.F | 11.0% | ME4N.F | 10.0% |
| ME5N.F | 10.0% | ME5N.F | 6.0% |
| CC-5-V | 14.0% | CC-5-V | 19.5% |
| CCG-V-F | 22.0% | CCG-V-F | 25.0% |
| CPTP-301 | 4.0% | PTP-102 | 4.0% |
| CCPC-33 | 5.0% | PTP-201 | 3.0% |
| CCPC-34 | 5.0% | CPTP-301 | 3.5% |
| CCPC-35 | 5.0% | CCPC-33 | 5.0% |
| CBC-33 | 2.0% | CCPC-34 | 5.0% |
| CBC-33F | 2.0% | CCPC-35 | 4.0% |
| | | CBC-33 | 3.0% |
| S→N: | <-40° C. | S→N: | <-40° C. |
| Clearing point: | +100.5° C. | Clearing point: | +103.0° C. |
| Visc. +20° C.: | 37 | Visc. +20° C.: | 25 |
| Δn [589 nm; 20° C.]: | 0.1315 | Δn [589 nm; 20° C.]: | 0.1310 |
| HTP S-811: | -12.0 | HTP S-811: | -11.1 |
| Twist: | 240° | Twist: | 240° |
| $V_{(10,0,20)}$ [V]: | 1.19 | $V_{(10,0,20)}$ [V]: | 1.52 |
| $(V_{90}/V_{10-1}) \cdot 100[\%]$: | 6.7 | $(V_{90}/V_{10-2}) \cdot 100[\%]$: | 5.3 |

EXAMPLE 29

Two-bottle system

| Mixture I | | Mixture II | |
|---|---|---|---|
| ME2N.F | 9.0% | ME2N.F | 3.0% |
| ME3N.F | 5.0% | ME3N.F | 3.0% |
| ME4N.F | 11.0% | ME4N.F | 5.0% |
| ME5N.V | 11.0% | ME5N.F | 5.0% |
| CC-5-V | 19.0% | CC-5-V | 22.0% |
| PTP-102 | 2.0% | PCH-301 | 18.0% |
| CCG-V-F | 18.0% | PTP-102 | 3.0% |
| CPTP-302 | 3.0% | CCG-V-F | 12.0% |
| CCPC-33 | 5.0% | BCH-32 | 10.0% |
| CCPE-34 | 5.0% | CPTP-301 | 3.0% |
| CCPC-35 | 5.0% | CPTP-302 | 4.0% |
| CBC-33F | 3.0% | CBC-33 | 5.0% |
| | | CBC-53 | 5.0% |
| | | CBC-33F | 2.0% |

-continued

| Mixture I | | Mixture II | |
|---|---|---|---|
| S→N: | <-40° C. | S→N: | <-40° C. |
| Clearing point: | +94.5° C. | Clearing point: | +95.0° C. |
| Visc. +20° C.: | 31 | Visc. +20° C.: | 16 |
| Δn [589 nm; 20° C.]: | +0.1295 | Δn [589 nm; 20° C.]: | +0.1295 |
| Twist: | 90° | Twist: | 90° |
| $V_{(10,0,20)}$ [V]: | 1.06 | $V_{(10,0,20)}$ [V]: | 2.07 |
| $(V_{90}/V_{10-1}) \cdot 100[\%]$: | 45.3 | $(V_{90}/V_{10-1}) \cdot 100[\%]$: | 40.1 |

EXAMPLE 30

| | | | |
|---|---|---|---|
| ME2N.F | 2.0% | S→Ni | <-40 |
| ME3N.F | 2.0% | Clearing point: | +95.5° C. |
| ME5N.F | 3.0% | Δn [589 nm; 20° C.]: | +0.1297 |
| CC-5-V | 20.0% | Twist: | 90° |
| CCH-34 | 8.0% | $V_{(10,0,20)}$ [V]: | 3.01 |
| PCH-301 | 12.0% | $V_{90}/V_{10-1} \cdot 100[\%]$: | 39.9 |
| PTP-102 | 4.0% | | |
| PTP-201 | 5.0% | | |
| CCG-V-F | 12.0% | | |
| CP-33F | 7.0% | | |
| CP-35F | 7.0% | | |
| BCH-32 | 6.0% | | |
| CPTP-301 | 4.0% | | |
| CPTP-302 | 4.0% | | |
| CPTP-303 | 4.0% | | |

EXAMPLE 31

| | | | |
|---|---|---|---|
| PCH-3N.F.F | 13.0% | S→N | <-40 |
| ME2N.F | 3.0% | Clearing point: | +68.0° C. |
| ME3N.F | 3.0% | Δn [589 nm; 20° C.]: | +0.1503 |
| K6 | 8.0% | Twist: | 90° |
| K9 | 8.0% | $V_{(10,0,20)}$ [V]: | 1.15 |
| K12 | 7.0% | $V_{90}/V_{10-1} \cdot 100[\%]$: | 40.9 |
| PCH-3 | 13.0% | | |
| HP-3N.F | 4.0% | | |
| HP-4N.F | 3.0% | | |
| HP-5N.F | 2.0% | | |
| CC-5-V | 7.0% | | |
| ME15 | 11.0% | | |
| CBC-33F | 3.0% | | |
| CBC-53F | 3.0% | | |
| CBC-55F | 3.0% | | |
| CBC-33 | 3.0% | | |
| CBC-53 | 3.0% | | |
| CBC-55 | 3.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystal display containing
   two outer plates which, together with a frame, form a cell,
   a nematic liquid-crystal mixture of positive dielectric anisotropy which is present in the cell,
   electrode layers with alignment layers on insides of the outer plates, a pretilt angle between a longitudinal axis of molecules at a surface of the outer plates and the outer plates of from 8 degree to 30 degrees, and a twist angle of the liquid-crystal mixture in the cell from alignment layer to alignment layer with a value of between 22.5° and 600°, a chiral nematic liquid-crystal mixture comprising
   a) 20–90% by weight of a liquid-crystalline component A consisting of one or more compounds having a dielectric anisotropy of greater than +1.5;
   b) 10–65% by weight of a liquid-crystalline component B consisting of one or more compounds having a dielectric anisotropy of −1.5 to +1.5;
   c) 0–20% by weight of a liquid-crystalline component D consisting of one or more compounds having a dielectric anisotropy of below −1.5, and
   d) 0–5% by weight of an optically active component C in such an amount that the ratio of the cell gap and the natural pitch of the chiral nematic liquid-crystal mixture is from about 0.2 to 1.3, wherein component A comprises at least one component of the formula IA

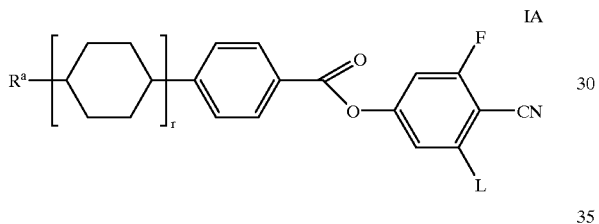

in which $R^a$ is an alkyl group having 1 to 12 carbon atoms, in which, in addition, one or two non-adjacent $CH_2$ groups may be replaced by —O—, —CH=CH—, —CO—, —OCO— or —COO—, L is H or F, and r is 0 to 1, and component B comprises at least one compound of the formula IB

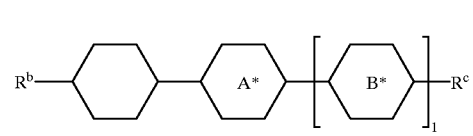

in which $R^b$ is an alkenyl radical having 2 to 12 carbon atoms, $R^c$ is F, or an unsubstituted or at least monofluoro-substituted alkyl or alkoxy radical having 1–6 carbon atoms,

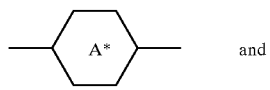

are each, independently of one another,

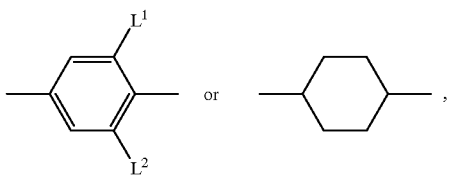

l is 0 or 1, and $L^1$ and $L^2$ are each, independently of one another, H or F.

2. A display according to claim 1, wherein component B comprises at least one compound of subformulae IB1 to IB6:

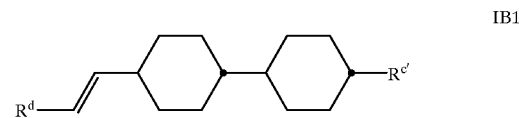

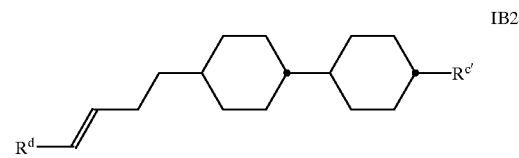

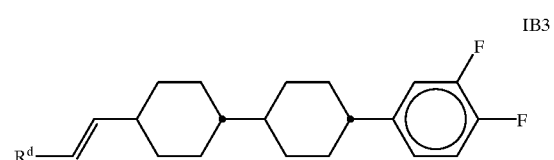

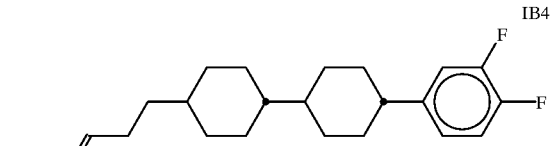

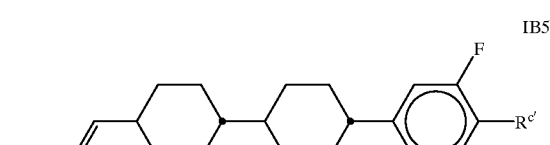

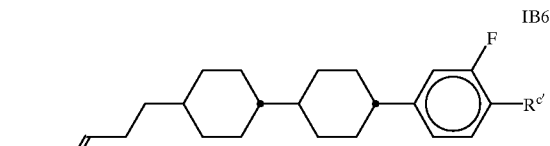

wherein $R^{c'}$ is a straight-chain alkyl or alkoxy radical having 1–6 carbon atoms, and $R^d$ is H, $CH_3$, $C_2H_5$ or n-$C_3H_7$.

3. A display according to claim 1, wherein component A additionally comprises compounds of formulae II and/or III

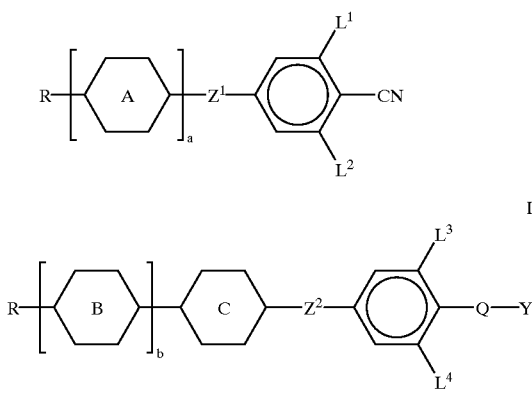

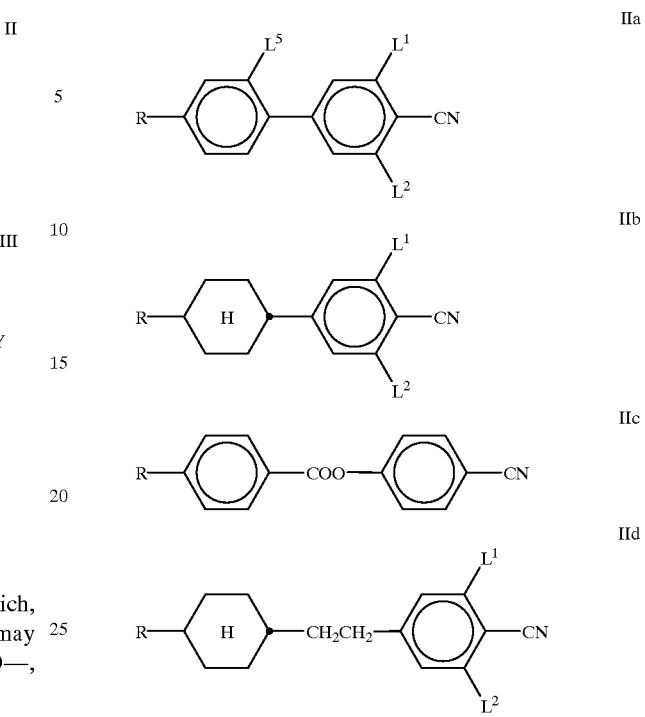

in which

R is an alkyl group having 1 to 12 carbon atoms, in which, in addition, one or two non-adjacent $CH_2$ groups may be replaced by —O—, —CH=CH—, —CO—, —OCO— or —COO—,

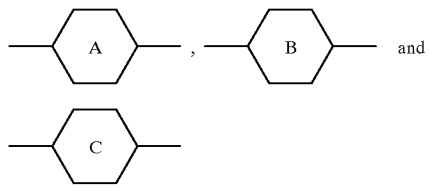

are each, independently of one another,

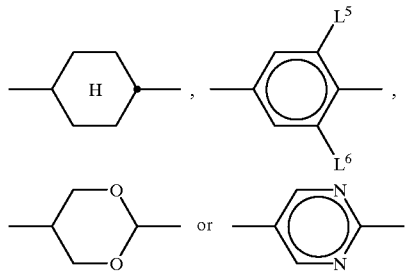

$L^{1-6}$ are each, independently of one another, H or F, $Z^1$ is —COO—, —$CH_2CH_2$— or a single bond, $Z^2$ is —$CH_2CH_2$—, —$CH_2O$—, —COO—, —C≡C— or a single bond, Q is —$CF_2$—, —CHF—, $OCF_2$, —OCF— or a single bond, Y is F or Cl a is 1 or 2, and b is 0 to 1.

4. A display according to claim 3, wherein component A comprises at least one compound of formula IIa to IId where R, $L^1$, $L^2$, $L^5$, are as defined above.

5. A display according to claim 1, wherein component B further comprises at least one of formulae IV1 to IV24:

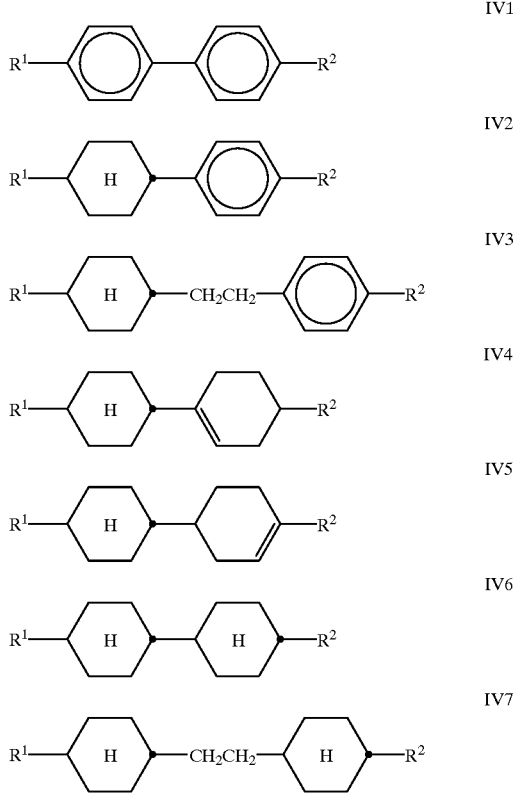

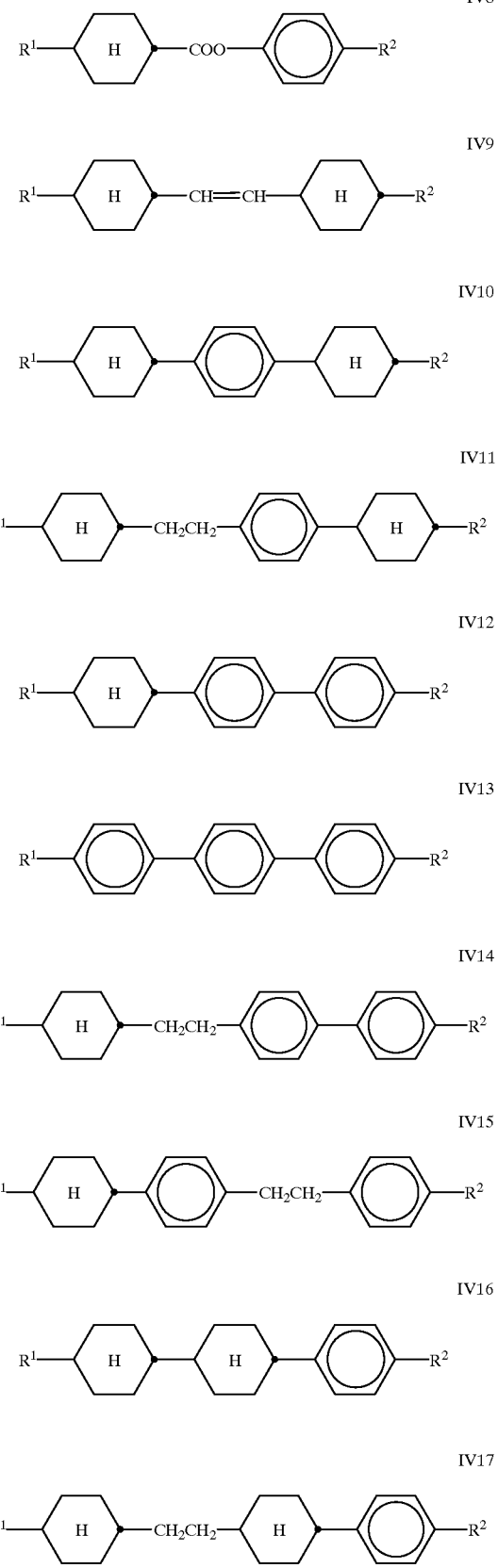
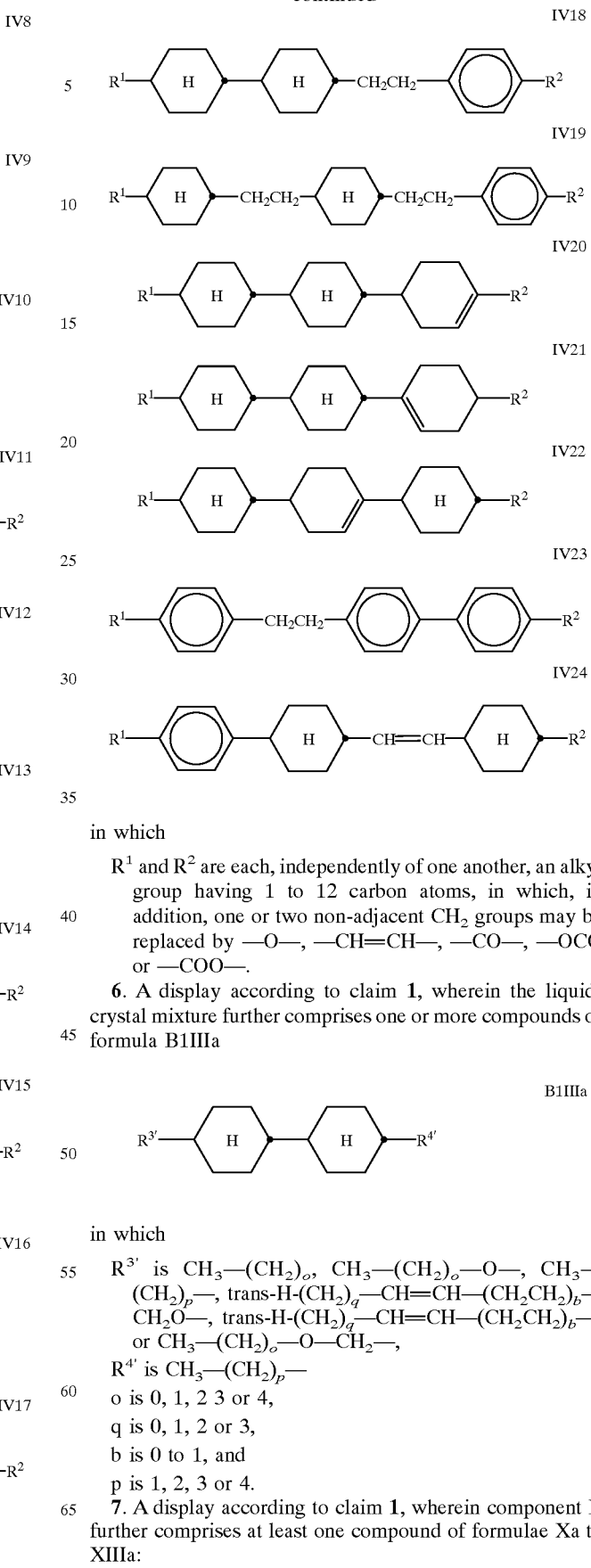

in which

R[1] and R[2] are each, independently of one another, an alkyl group having 1 to 12 carbon atoms, in which, in addition, one or two non-adjacent $CH_2$ groups may be replaced by —O—, —CH=CH—, —CO—, —OCO or —COO—.

6. A display according to claim 1, wherein the liquid-crystal mixture further comprises one or more compounds of formula B1IIIa in which R[3'] is $CH_3$—$(CH_2)_o$, $CH_3$—$(CH_2)_o$—O—, $CH_3$—$(CH_2)_p$—, trans-H-$(CH_2)_q$—CH=CH—$(CH_2CH_2)_b$—$CH_2O$—, trans-H-$(CH_2)_q$—CH=CH—$(CH_2CH_2)_b$—, or $CH_3$—$(CH_2)_o$—O—$CH_2$—, R[4'] is $CH_3$—$(CH_2)_p$— o is 0, 1, 2 3 or 4, q is 0, 1, 2 or 3, b is 0 to 1, and p is 1, 2, 3 or 4.

7. A display according to claim 1, wherein component B further comprises at least one compound of formulae Xa to XIIIa:

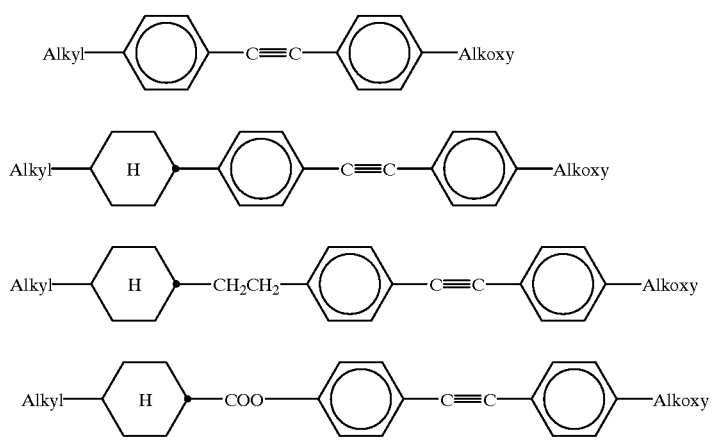

in which Alkyl and Alkoxy are a straight-chain alkyl or alkoxy radical having 1 to 7 carbon atoms.

8. A display according to claim 1, wherein component A further comprises at least one compound of formula T3

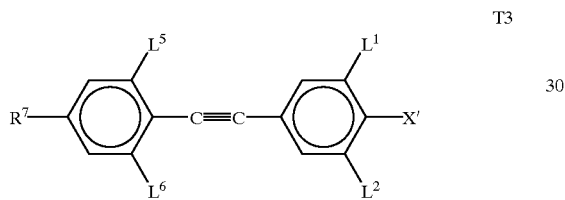

in which $R^7$ is $-C_xH_{2x+1}$, $-OC_xH_{2x+1}$,

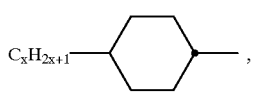

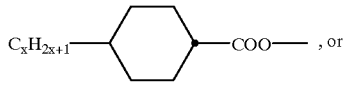, or

x is an integer from 1–15, $L^1, L^2, L^5,$ and $L^6$ are each, independently of one another, H or F, and X' is F, Cl or $OCF_3$.

9. A liquid-crystal mixture comprising a) 20–90% by weight of a liquid-crystalline component A consisting of one or more compounds having a dielectric anisotropy of greater than +1.5;

b) 10–65% by weight of a liquid-crystalline component B consisting of one or more compounds having a dielectric anisotropy of −1.5 to +1.5;

c) 0–20% by weight of a liquid-crystalline component D consisting of one or more compounds having a dielectric anisotropy of below −1.5, and d) 0–5% by weight of an optically active component C in such an amount that the ratio of the cell gap and the natural pitch of the chiral nematic liquid-crystal mixture is from about 0.2 to 1.3, when placed in a cell having electrode layers with alignment layers on insides of the outer plates, a pretilt angle between a longitudinal axis of molecules at a surface of the outer plates and the outer plates of from 8 degree to 30 degrees, and a twist angle of the liquid-crystal mixture in the cell from alignment layer to alignment layer with a value of between 22.5° and 600°, wherein component A comprises at least one component of the formula IA

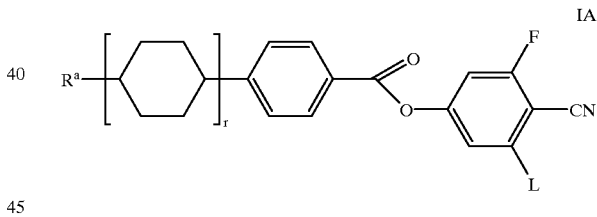

in which $R^a$ is an alkyl group having 1 to 12 carbon atoms, in which, in addition, one or two non-adjacent $CH_2$ groups may be replaced by $-O-$, $-CH=CH-$, $-CO-$, $-OCO-$ or $-COO-$, L is H or F, and r is 0 to 1, and component B comprises at least one compound of the formula IB

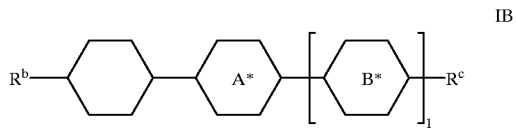

in which $R^b$ is an alkenyl radical having 2 to 12 carbon atoms, $R^c$ is F, or an unsubstituted or at least monofluoro-substituted alkyl or alkoxy radical having 1–6 carbon atoms,

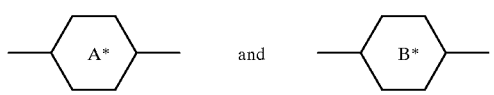

are each, independently of one another,

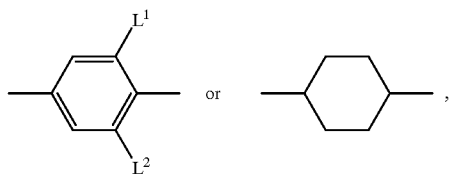

l is 0 or 1, and
$L^1$ and $L^2$ are each, independently of one another, H or F.

10. A mixture according to claim 9, wherein component B comprises at least one compound of subformulae IB1 to IB6:

IB1
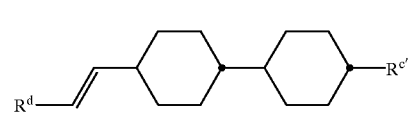

IB2
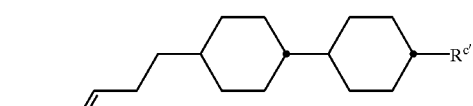

IB3

IB4
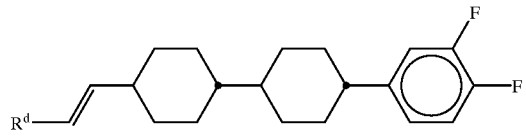

IB5
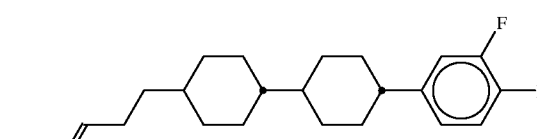

IB6
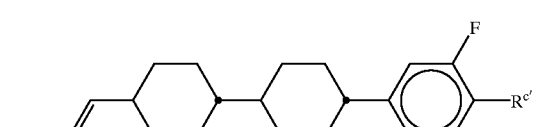

wherein
$R^{c'}$ is a straight-chain alkyl or alkoxy radical having 1–6 carbon atoms, and $R^d$ is H, $CH_3$, $C_2H_5$ or n-$C_3H_7$.

11. A mixture according to claim 9, wherein component A additionally comprises compounds of formulae II and/or III II
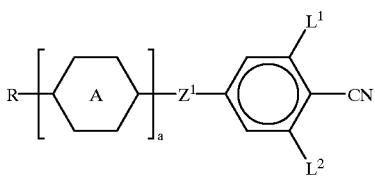

III
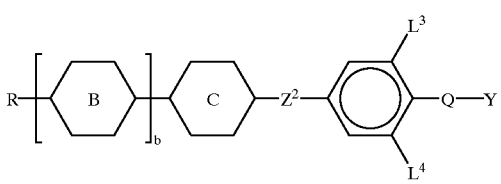

in which

R is an alkyl group having 1 to 12 carbon atoms, in which, in addition, one or two non-adjacent $CH_2$ groups may be replaced by —O—, —CH=CH—, —CO—, —OCO— or —COO—,

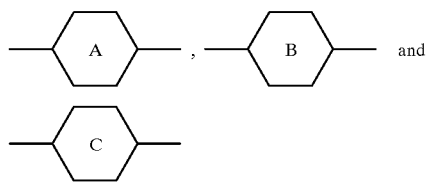

are each, independently of one another,

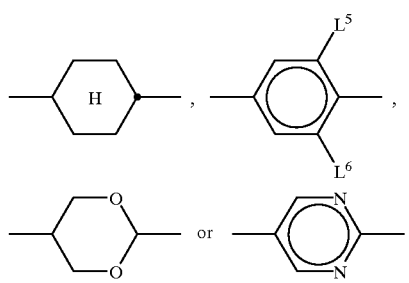

$L^{1-6}$ are each, independently of one another, H or F, $Z^1$ is —COO—, —$CH_2CH_2$— or a single bond, $Z^2$ is —$CH_2CH_2$—, —$CH_2O$—, —COO—, —C≡C— or a single bond, Q is —$CH_2$—, —CHF—, $OCF_2$, —OCHF— or a single bond, Y is F or Cl a is 1 or 2, and b is 0 to 1.

12. A mixture according to claim 11, wherein component A comprises at least one compound of formula IIa to IId

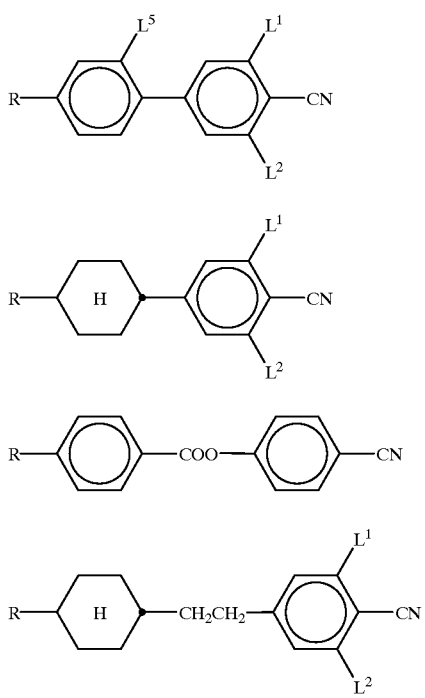
where R, L¹, L², L⁵, are as defined above.
13. A mixture according to claim 9, wherein component B further comprises at least one of formulae IV1 to IV24:
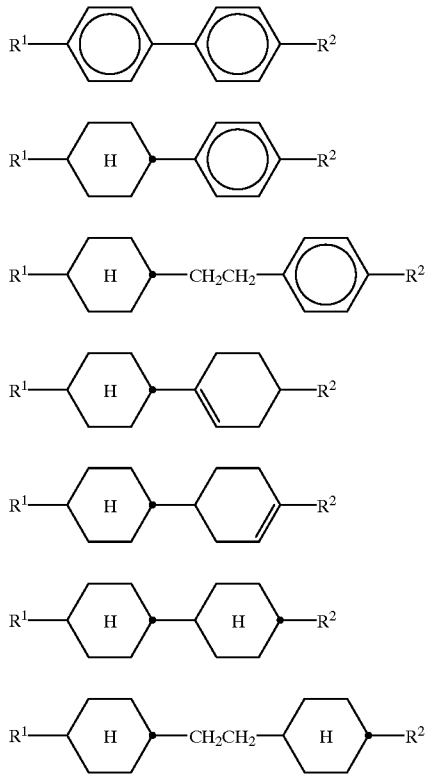
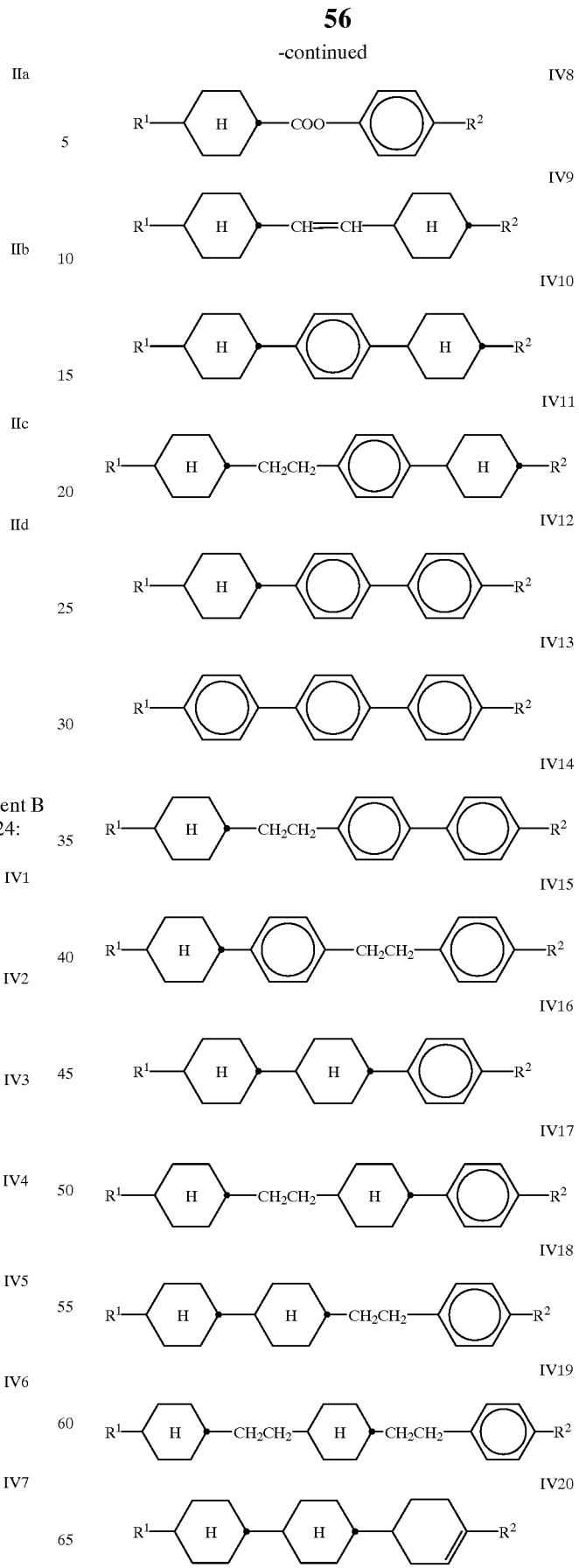

IV21

IV22

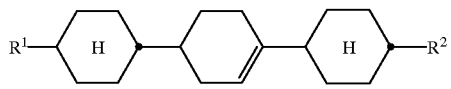

IV23

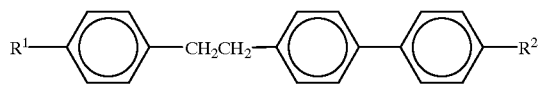

IV24

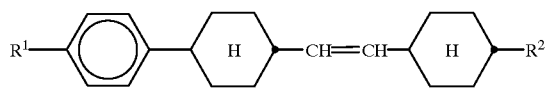

in which

R$^1$ and R$^2$ are each, independently of one another, an alkyl group having 1 to 12 carbon atoms, in which, in 14. A mixture according to claim 9, wherein the liquid-crystal mixture further comprises one or more compounds of formula B1IIIa:

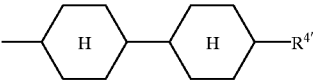

B1IIIa in which

R$^{3'}$ is CH$_3$—(CH$_2$)$_o$, CH$_3$—(CH$_2$)$_o$—O—, CH$_3$—(CH$_2$)$_p$—, trans-H-(CH$_2$)$_q$—CH=CH—(CH$_2$CH$_2$)$_b$—CH$_2$O—, trans-H-(CH$_2$)$_q$—CH=CH—(CH$_2$CH$_2$)$_b$—, or CH$_3$—(CH$_2$)$_o$—O—CH$_2$—, R$^{4'}$ is CH$_3$—(CH$_2$)$_p$— o is 0, 1, 2 3 or 4, q is 0, 1, 2 or 3, b is 0 to 1, and p is 1, 2, 3 or 4.

15. A mixture according to claim 9, wherein component B further comprises at least one compound of formulae Xa to XIIIa:

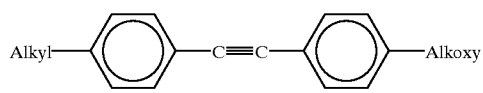

Xa

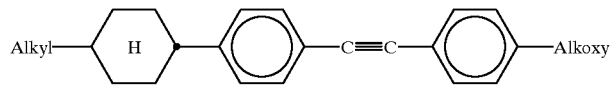

XIa

XIIa

XIIIa in which Alkyl and Alkoxy are a straight-chain alkyl or alkoxy radical having 1 to 7 carbon atoms.

16. A mixture according to claim 9, wherein component A further comprises at least one compound of formula T3

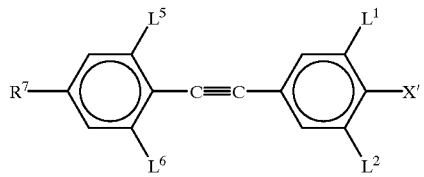

in which addition, one or two non-adjacent $CH_2$ groups may be replaced by —O—, —CH=CH—, —CO—, —OCO or —COO—.

$R^7$ is —$C_xH_{2x+1}$, —$OC_xH_{2x+1}$,

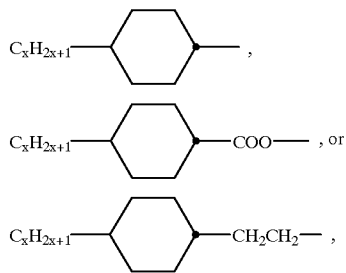

x is an integer from 1–15, $L^1, L^2, L^5$, and $L^6$ are each, independently of one another, H or F, and X' is F, Cl or $OCF_3$.

* * * * *